(12) United States Patent
Wang et al.

(10) Patent No.: US 10,873,974 B2
(45) Date of Patent: Dec. 22, 2020

(54) PREAMBLE SEQUENCE CONFIGURATION METHOD, USER EQUIPMENT, AND ACCESS NETWORK DEVICE

(71) Applicant: HUAWEI TECHNOLOGIES CO., LTD., Guangdong (CN)

(72) Inventors: Guijie Wang, Hangzhou (CN); Jian Wang, Hangzhou (CN); Meixin Lin, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/258,097

(22) Filed: Jan. 25, 2019

(65) Prior Publication Data
US 2019/0159262 A1 May 23, 2019

Related U.S. Application Data

(63) Continuation of application No. PCT/CN2017/090323, filed on Jun. 27, 2017.

(30) Foreign Application Priority Data

Jul. 26, 2016 (CN) .......................... 2016 1 0594750

(51) Int. Cl.
*H04W 74/08* (2009.01)
*H04W 28/02* (2009.01)
(Continued)

(52) U.S. Cl.
CPC ....... *H04W 74/0833* (2013.01); *H04L 1/0038* (2013.01); *H04L 1/0061* (2013.01);
(Continued)

(58) Field of Classification Search
CPC .......... H04W 74/0833; H04W 74/006; H04W 48/16; H04W 24/08; H04W 28/02;
(Continued)

(56) References Cited

U.S. PATENT DOCUMENTS

2010/0103911 A1* 4/2010 Ji ........................... H04W 48/08
370/338
2010/0135274 A1* 6/2010 Hong ................... H04B 7/2656
370/345
(Continued)

FOREIGN PATENT DOCUMENTS

| CN | 103716895 A | 4/2014 |
|---|---|---|
| CN | 104469966 A | 3/2015 |
| WO | 2015190961 A1 | 12/2015 |

OTHER PUBLICATIONS

Jian et al. Partial Proposal for 802.11n: ITRI Preamble Specification; Aug. 13, 2004.*
(Continued)

*Primary Examiner* — Jay P Patel
(74) *Attorney, Agent, or Firm* — Fish & Richardson P.C.

(57) ABSTRACT

This application provides a preamble sequence configuration method, user equipment, and an access network device. The method in embodiments of this application includes: determining, by an access network device, preamble sequence information, where the preamble sequence information includes a message indicating a quantity of preamble sequences; and sending, by the access network device, the preamble sequence information to user equipment, where the preamble sequence information is used by the user equipment for random access.

18 Claims, 10 Drawing Sheets

(51) Int. Cl.
*H04W 24/08* (2009.01)
*H04W 48/16* (2009.01)
*H04W 74/00* (2009.01)
*H04L 1/00* (2006.01)
*H04W 72/04* (2009.01)
*H04W 88/02* (2009.01)
*H04L 5/00* (2006.01)

(52) U.S. Cl.
CPC ........... *H04W 24/08* (2013.01); *H04W 28/02* (2013.01); *H04W 48/16* (2013.01); *H04W 72/0446* (2013.01); *H04W 72/0453* (2013.01); *H04W 72/0466* (2013.01); *H04W 74/006* (2013.01); *H04W 88/023* (2013.01); *H04L 5/0016* (2013.01)

(58) Field of Classification Search
CPC ........... H04W 88/023; H04W 72/0453; H04W 72/0446; H04W 28/08; H04W 28/04; H04W 28/0215; H04W 72/0466; H04L 1/0061; H04L 1/0038; H04L 5/0016
See application file for complete search history.

(56) References Cited

U.S. PATENT DOCUMENTS

| | | | | |
|---|---|---|---|---|
| 2013/0077582 | A1* | 3/2013 | Kim | H04W 74/002 370/329 |
| 2014/0036747 | A1* | 2/2014 | Nory | H04W 72/0406 370/311 |
| 2014/0177607 | A1* | 6/2014 | Li | H04W 52/42 370/336 |
| 2014/0341146 | A1* | 11/2014 | Nakashima | H04W 72/042 370/329 |
| 2016/0037550 | A1* | 2/2016 | Barabell | H04B 17/318 455/450 |
| 2016/0043849 | A1* | 2/2016 | Lee | H04W 72/042 370/329 |
| 2016/0182209 | A1* | 6/2016 | Li | H04W 72/0446 370/329 |
| 2016/0192398 | A1 | 6/2016 | Wang et al. | |
| 2016/0323916 | A1* | 11/2016 | Lee | H04W 76/10 |
| 2017/0288888 | A1* | 10/2017 | Rico Alvarino | H04L 12/189 |
| 2018/0131491 | A1* | 5/2018 | Xiong | H04W 72/044 |
| 2018/0138962 | A1* | 5/2018 | Islam | H04L 5/0032 |
| 2018/0249439 | A1* | 8/2018 | Xu | H04W 68/02 |
| 2019/0104549 | A1* | 4/2019 | Deng | H04B 7/0617 |
| 2019/0239277 | A1* | 8/2019 | Liu | H04L 5/0053 |
| 2020/0260407 | A1* | 8/2020 | Xu | H04W 68/005 |

OTHER PUBLICATIONS

3GPP TS 36.211 V124.0 (Dec. 2014),3rd Generation Partnership Project;Technical Specification Group Radio Access Network;Evolved Universal Terrestrial Radio Access (E-UTRA);Physical channels and modulation(Release 12),total 124 pages.

3GPP TS 36.331 V13.0.0 (Dec. 2015),3rd Generation Partnership Project;Technical Specification Group Radio Access Network;Evolved Universal Terrestrial Radio Access (E-UTRA);Radio Resource Control (RRC);Protocol specification (Release 13),total 507 pages.

Calderbank, R., and Jafarpour, S. (2010)."Reed Muller sensing matrices and the LASSO". In Sequences and Their Applications—SETA 2010 (pp. 442-463). Springer Berlin Heidelberg.

International Search Report and Written Opinion issued in International Application No. PCT/CB2017/090323 dated Sep. 15, 2017, 15 pages.

3GPP TS 36.212 V13.2.0 (Jun. 2016), "3rd Generation Partnership Project; Technical Specification Group Radio Access Network; Evolved Universal Terrestrial Radio Access (E-UTRA); Multiplexing and channel coding (Release 13)," Technical Specification, Jun. 2016, XP051123279, 140 pages.

3GPP TS 36.331 V13.2.0 (Jun. 2016), "3rd Generation Partnership Project; Technical Specification Group Radio Access Network; Evolved Universal Terrestrial Radio Access (E-UTRA); Radio Resource Control (RRC); Protocol specification (Release 13)," Technical Specification, Jul. 2016, XP051123115, pp. 1-200.

Extended European Search Report issued in European Application No. 17833374.6 dated May 31, 2019, 10 pages.

R1-150132—Alcatel-Lucent et al., "Considerations on PRACH for LC-MTC," 3GPP TSG RAN WG1 Meeting #80, Athens, Greece; Feb. 9-13, 2015, XP050933346, 6 pages.

* cited by examiner

| Quantity of eNB antenna ports | PBCH CRC code $(X_{ant, 0}, X_{ant, 1}, X_{ant, 2}, X_{ant, 3}, \ldots, X_{ant, 15})$ |
|---|---|
| 1 | (0,0,0,0,0,0,0,0,0,0,0,0,0,0,0,0) |
| 2 | (1,1,1,1,1,1,1,1,1,1,1,1,1,1,1,1) |
| 4 | (0,1,0,1,0,1,0,1,0,1,0,1,0,1,0,1) |

FIG. 7

PREAMBLE SEQUENCE CONFIGURATION METHOD, USER EQUIPMENT, AND ACCESS NETWORK DEVICE

CROSS-REFERENCE TO RELATED APPLICATIONS

This application is a continuation of International Application No. PCT/CN2017/090323, filed on Jun. 27, 2017, which claims priority to Chinese Patent Application No. 201610594750.5, filed on Jul. 26, 2016. The disclosures of the aforementioned applications are hereby incorporated by reference in their entireties.

TECHNICAL FIELD

Embodiments of this application relate to the field of communications technologies, and in particular, to a preamble sequence configuration method, user equipment, and an access network device.

BACKGROUND

A current communications system is faced challenges such as massive connections, a low delay, and highly reliable transmission. For example, in the Internet of Things (Internet of Things, IoT), a main service scenario is massive and/or highly reliable machine type communications (Machine-Type Communications, MTC). Main characteristics of the massive MTCs are massive connections, small data packets, low costs, and the like. Therefore, the IoT puts forward a higher requirement for an access resource. In a cellular mobile communications system, an access resource is a preamble sequence (Preamble) randomly selected by user equipment (User Equipment, UE) in an access process before the user equipment starts to communicate with a network. Because the UE randomly selects a preamble sequence, it is possible that a plurality of UEs transmit a same preamble sequence at the same time, causing a random access (Random Access, RA) conflict.

A contention-based RA process is shown in FIG. 1. Step 1: UE sends a Msg 1 to an access network device on a physical RA channel (Physical Random Access Channel, PRACH) specified by a communications network system, where the Msg 1 is a preamble sequence used for RA. Step 2: The access network device sends a Msg 2 based on a detection result of the received preamble sequence, where the Msg 2 is a random access response (Random Access Response, RAR). Step 3: UE that has no RA conflict transfers an exact Msg 3 to the access network device, where the Msg 3 is an RA process message, such as tracking area update or a scheduling request. Step 4: The access network device resolves contention between a plurality of UEs, and feeds back a Msg 4 to the UE.

A preamble sequence may be used to differentiate different UEs on a same PRACH time-frequency resource. If more than one UE transmits a same preamble sequence on a same PRACH time-frequency resource, a random access conflict occurs, causing a random access failure.

SUMMARY

This application provides a preamble sequence configuration method, user equipment, and an access network device, so that the user equipment can randomly access a communications network system, reducing a probability of a random access failure.

A first aspect of this application provides a preamble sequence configuration method, including:
determining, by an access network device, preamble sequence information, where the preamble sequence information includes a message used to indicate a quantity of preamble sequences; and
sending, by the access network device, the preamble sequence information to user equipment, where the preamble sequence information is used by the user equipment for random access.

When the user equipment performs random access, the user equipment needs to select one preamble sequence from a quantity of preamble sequences that is specified by the access network device and send the preamble sequence to the access network device. Before the preamble sequence is sent to the access network device, the access network device determines the preamble sequence information based on a preamble sequence space configuration parameter, where the preamble sequence information includes the message used to indicate a quantity of preamble sequences, and sends the preamble sequence information to the user equipment, so that the user equipment can perform random access based on the preamble sequence information. In this way, the user equipment can randomly access a communications network system successfully, reducing a probability of a random access failure.

With reference to the first aspect of this application, in a first implementation of the first aspect of this application, the preamble sequence information further includes space level information, and the space level information is used to indicate a quantity of code domain space layers of preamble sequence space.

A preamble sequence crosses time domain, frequency domain, and code domain, and optional preamble sequence space includes a plurality of layers of code domain space in a code domain. In addition to including the message used to indicate a quantity of preamble sequences, the preamble sequence information determined by the access network device further includes the space level information used to indicate the quantity of code domain space layers of the preamble sequence space.

With reference to the first implementation of the first aspect of this application, in a second implementation of the first aspect of this application, the sending, by the access network device, the preamble sequence information to user equipment includes:
generating, by the access network device, a CRC code based on the space level information;
performing, by the access network device, check processing on a MIB based on the CRC code; and
sending, by the access network device over a PBCH, the MIB that has undergone check processing.

Before the user equipment performs random access, in a system message sent by the access network device to the user equipment, system information includes a master system information block (Master Information Block, MIB) and a plurality of SIBs, and the cyclic redundancy check (Cyclic Redundancy Check, CRC) code is generated based on the space level information to perform check processing on the MIB. When obtaining the MIB through blind detection on the PBCH, the user equipment can obtain the accurate space level information based on the removed CRC code. Therefore, the space level information can be transmitted by using a check process, reducing signaling overheads.

With reference to the second implementation of the first aspect of this application, in a third implementation of the first aspect of this application, the generating, by the access network device, a CRC code based on the space level information includes:

determining, by the access network device, a corresponding CRC design rule based on the space level information, and generating the CRC code based on the CRC design rule, where a correspondence between the space level information and the CRC design rule is known by both the access network device and the user equipment.

Before the user equipment performs random access, a communications system presets a correspondence that is between space level information and a CRC design rule and that is known by both the user equipment and the access network device, so that a different CRC design rule is selected based on different space level information to generate a CRC code. When obtaining the MIB through blind detection, the user equipment can determine the CRC design rule based on the removed CRC code, and therefore obtains the accurate space level information corresponding to the CRC design rule.

With reference to the first implementation of the first aspect of this application, in a fourth implementation of the first aspect of this application, the sending, by the access network device, the preamble sequence information to user equipment includes:

generating, by the access network device, a scrambling code sequence based on the space level information;

performing, by the access network device, scrambling processing on a MIB based on the scrambling code sequence; and sending, by the access network device over a PBCH, the MIB that has undergone scrambling processing.

Before the user equipment performs random access, the scrambling code sequence is generated based on the space level information, and scrambling processing is performed on the MIB based on the scrambling code sequence. When obtaining the MIB through blind detection on the PBCH, the user equipment can obtain the accurate space level information based on a used decoding sequence. Therefore, the space level information can be transmitted by using a descrambling processing process, reducing signaling overheads.

With reference to the fourth implementation of the first aspect of this application, in a fifth implementation of the first aspect of this application, the generating, by the access network device, a scrambling code sequence based on the space level information includes:

determining, by the access network device, a corresponding descrambling design rule based on the space level information, and generating the scrambling code sequence based on the descrambling design rule, where a correspondence between the space level information and the descrambling design rule is known by both the access network device and the user equipment.

Before the user equipment performs random access, a communications system presets a correspondence that is between space level information and a descrambling design rule and that is known by both the user equipment and the access network device, so that a different descrambling design rule is selected based on different space level information to generate a scrambling code sequence for performing scrambling processing on the MIB. When obtaining the MIB through blind detection, the user equipment can determine the descrambling design rule based on the used decoding sequence, and therefore obtains the accurate space level information corresponding to the descrambling design rule.

With reference to the first implementation of the first aspect of this application, in a sixth implementation of the first aspect of this application, the sending, by the access network device, the preamble sequence information to user equipment includes:

adding, by the access network device, the space level information in the preamble sequence information to a SIB; and sending, by the access network device, the SIB over a PDSCH.

Before the user equipment performs random access, in a system message sent by the access network device to the user equipment, system information includes a MIB and a plurality of SIBs. There are a plurality of types of SIBs, and time-frequency resource information is usually indicated by using a field in a SIB 2. Therefore, the space level information in the preamble sequence information can still be indicated by using the field in the SIB 2. In this way, the SIB 2 carries the space level information, and the SIB 2 is sent to the user equipment over the PDSCH, so that after receiving the SIB 2, the user equipment can obtain the space level information by parsing the field in the SIB 2.

With reference to the first implementation of the first aspect, the second implementation of the first aspect, the third implementation of the first aspect, the fourth implementation of the first aspect, the fifth implementation of the first aspect, or the sixth implementation of the first aspect of this application, in a seventh implementation of the first aspect of this application, the preamble sequence information further includes time-frequency resource information, and the time-frequency resource information is used to indicate a time-frequency resource occupied by the preamble sequence space on a PRACH; and the sending, by the access network device, the preamble sequence information to user equipment further includes:

adding, by the access network device, the time-frequency resource information in the preamble sequence information to the SIB; and sending, by the access network device, the SIB over the PDSCH.

Before the user equipment performs random access, in a system message sent by the access network device to the user equipment, system information includes a MIB and a plurality of SIBs. There are a plurality of types of SIBs, and time-frequency resource information is usually indicated by using a field in a SIB 2. Therefore, to avoid additional workload, the time-frequency resource information is still carried in the SIB 2.

With reference to the first aspect, the first implementation of the first aspect, the second implementation of the first aspect, the third implementation of the first aspect, the fourth implementation of the first aspect, the fifth implementation of the first aspect, the sixth implementation of the first aspect, or the seventh implementation of the first aspect of this application, in an eighth implementation of the first aspect of this application, before the determining, by an access network device, preamble sequence information, the method further includes:

obtaining, by the access network device, a preamble sequence space configuration parameter, where the preamble sequence space configuration parameter includes network load, a system parameter, and a quantity of user equipments.

Before determining the preamble sequence information, the access network device needs to obtain the preamble sequence space configuration parameter. The preamble sequence space configuration parameter includes the network load, the system parameter, and the quantity of user equipments. The system parameter includes at least one of a user sequence length, a collision probability tolerance value, a residual probability tolerance value, a timing estimation error, a channel estimation error, a bit error rate, an available time-frequency resource size, an available computing resource size, received signal power, and a signal-to-noise ratio. Therefore, the access network device can determine the preamble sequence information based on the preamble sequence space configuration parameter.

A second aspect of this application provides a preamble sequence configuration method, including:

obtaining, by user equipment, preamble sequence information sent by an access network device, where the preamble sequence information includes a message used to indicate a quantity of preamble sequences; and performing, by the user equipment, random access based on the preamble sequence information.

When the user equipment performs random access, the user equipment needs to select one preamble sequence from a quantity of preamble sequences that is specified by the access network device and send the preamble sequence to the access network device. Before the preamble sequence is sent to the access network device, the user equipment obtains the preamble sequence information sent by the access network device, where the preamble sequence information includes the message used to indicate a quantity of preamble sequences; and the user equipment performs random access based on the received preamble sequence information. In this way, the user equipment can randomly access a communications network system successfully, reducing a probability of a random access failure.

With reference to the second aspect of this application, in a first implementation of the second aspect of this application, the preamble sequence information further includes space level information, and the space level information is used to indicate a quantity of code domain space layers of preamble sequence space.

A preamble sequence crosses time domain, frequency domain, and code domain, and optional preamble sequence space includes a plurality of layers of code domain space in a code domain. In addition to including the message used to indicate a quantity of preamble sequences, the preamble sequence information determined by the access network device further includes the space level information used to indicate the quantity of code domain space layers of the preamble sequence space.

With reference to the first implementation of the second aspect of this application, in a second implementation of the second aspect of this application, the obtaining, by user equipment, preamble sequence information sent by an access network device includes:

performing, by the user equipment, blind detection on a PBCH to obtain a MIB, and determining the space level information based on a CRC code removed during the blind detection.

The access network device generates a different CRC code based on different space level information to perform check processing on the MIB. When obtaining the MIB through blind detection on the PBCH, the user equipment can obtain the accurate space level information based on the removed CRC code. Therefore, the space level information can be transmitted by using a check process, reducing signaling overheads.

With reference to the second implementation of the second aspect of this application, in a third implementation of the second aspect of this application, the performing, by the user equipment, blind detection on a PBCH to obtain a MIB, and determining the space level information based on a CRC code removed during the blind detection includes:

performing, by the user equipment, blind detection on the PBCH to obtain the MIB, determining a CRC design rule based on the CRC code removed during the blind detection, and obtaining the corresponding space level information based on the CRC design rule, where a correspondence between the space level information and the CRC design rule is known by both the access network device and the user equipment.

Before the user equipment performs random access, a communications system presets a correspondence that is between space level information and a CRC design rule and that is known by both the user equipment and the access network device, so that a different CRC design rule is selected based on different space level information to generate a CRC code. When obtaining the MIB through blind detection, the user equipment can determine the CRC design rule based on the removed CRC code, and therefore obtains the accurate space level information corresponding to the CRC design rule.

With reference to the first implementation of the second aspect of this application, in a fourth implementation of the second aspect of this application, the obtaining, by user equipment, preamble sequence information sent by an access network device includes:

performing, by the user equipment, blind detection on a PBCH to obtain a MIB, and determining the space level information based on a decoding sequence used during the blind detection.

The access network device generates a different scrambling code sequence based on different space level information to perform scrambling processing on the MIB. When obtaining the MIB through blind detection on the PBCH, the user equipment can obtain the accurate space level information based on the used decoding sequence. Therefore, the space level information can be transmitted by using a descrambling processing process, reducing signaling overheads.

With reference to the fourth implementation of the second aspect of this application, in a fifth implementation of the second aspect of this application, the performing, by the user equipment, blind detection on a PBCH to obtain a MIB, and determining the space level information based on a decoding sequence used during the blind detection includes:

performing, by the user equipment, blind detection on the PBCH to obtain the MIB, determining a descrambling design rule based on the decoding sequence used during the blind detection, and obtaining the corresponding space level information based on the descrambling design rule, where a correspondence between the space level information and the descrambling design rule is known by both the access network device and the user equipment.

Before the user equipment performs random access, a communications system presets a correspondence that is between space level information and a descrambling design rule and that is known by both the user equipment and the access network device, so that a different descrambling design rule is selected based on different space level information to generate a scrambling code sequence for performing scrambling processing on the MIB. When obtaining the MIB through blind detection, the user equipment can determine the descrambling design rule based on the used decoding sequence, and therefore obtains the accurate space level information corresponding to the descrambling design rule.

With reference to the first implementation of the second aspect of this application, in a sixth implementation of the second aspect of this application, the obtaining, by user equipment, preamble sequence information sent by an access network device includes:

receiving, by the user equipment over a PDSCH, a SIB sent by the access network device, where the SIB carries the space level information in the preamble sequence information; and parsing, by the user equipment, the SIB to obtain the space level information.

Before the user equipment performs random access, in a system message sent by the access network device to the user equipment, system information includes a MIB and a plurality of SIBs. There are a plurality of types of SIBs, and time-frequency resource information is usually indicated by using a field in a SIB 2. Therefore, the space level information in the preamble sequence information can still be indicated by using the field in the SIB 2. In this way, the SIB 2 carries the preamble sequence information, and the user equipment receives, over the PDSCH, the SIB 2 sent by the access network device, and obtains the space level information by parsing the SIB 2.

With reference to the first implementation of the second aspect, the second implementation of the second aspect, the third implementation of the second aspect, the fourth implementation of the second aspect, the fifth implementation of the second aspect, or the sixth implementation of the second aspect of this application, in a seventh implementation of the second aspect of this application, the preamble sequence information further includes time-frequency resource information, and the time-frequency resource information is used to indicate a time-frequency resource occupied by the preamble sequence space on a PRACH; and the obtaining, by user equipment, preamble sequence information sent by an access network device further includes:

receiving, by the user equipment over the PDSCH, the SIB sent by the access network device, where the SIB carries the time-frequency resource information in the preamble sequence information; and parsing, by the user equipment, the SIB to obtain the time-frequency resource information.

Before the user equipment performs RA, in a system message sent by the access network device to the user equipment, system information includes a MIB and a plurality of SIBs. There are a plurality of types of SIBs, and time-frequency resource information is usually indicated by using a field in a SIB 2. Therefore, to avoid additional workload, the time-frequency resource information is still carried in the SIB 2.

A third aspect of this application provides an access network device, including a processor and a transmitter, where the processor is connected to the transmitter;

the processor is configured to determine preamble sequence information, where the preamble sequence information includes a message used to indicate a quantity of preamble sequences; and the transmitter is configured to send the preamble sequence information to user equipment, where the preamble sequence information is used by the user equipment for random access.

When the user equipment performs random access, the user equipment needs to select one preamble sequence from a quantity of preamble sequences that is specified by the access network device and send the preamble sequence to the access network device. Before the preamble sequence is sent to the access network device, the processor determines the preamble sequence information based on a preamble sequence space configuration parameter, where the preamble sequence information includes the message used to indicate a quantity of preamble sequences, and the transmitter sends the preamble sequence information to the user equipment, so that the user equipment can perform random access based on the preamble sequence information. In this way, the user equipment can randomly access a communications network system successfully, reducing a probability of a random access failure.

With reference to the third aspect of this application, in a first implementation of the third aspect of this application, the preamble sequence information further includes space level information, and the space level information is used to indicate a quantity of code domain space layers of preamble sequence space;

the processor is further configured to generate a CRC code based on the space level information;

the processor is further configured to perform check processing on a MIB based on the CRC code; and the transmitter is configured to send, over a PBCH, the MIB that has undergone check processing.

The preamble sequence information includes the space level information, and a correspondence that is between space level information and a CRC design rule and that is known by both the user equipment and the access network device is preset, so that the processor generates a different CRC code based on different space level information to perform check processing on the MIB. The transmitter sends, over the PBCH, the MIB that has undergone check processing. When obtaining the MIB through blind detection on the PBCH, the user equipment can obtain the accurate space level information based on the removed CRC code. Therefore, the space level information can be transmitted by using a check process, reducing signaling overheads.

With reference to the third aspect of this application, in a second implementation of the third aspect of this application, the preamble sequence information further includes space level information, and the space level information is used to indicate a quantity of code domain space layers of preamble sequence space;

the processor is further configured to generate a scrambling code sequence based on the space level information;

the processor is further configured to perform scrambling processing on a MIB based on the scrambling code sequence; and the transmitter is configured to send, over a PBCH, the MIB that has undergone scrambling processing.

The preamble sequence information includes the space level information, and a correspondence that is between space level information and a descrambling design rule and that is known by both the user equipment and the access network device is preset, so that the processor generates a different scrambling code sequence based on different space level information to perform scrambling processing on the MIB. The transmitter sends, over the PBCH, the MIB that has undergone check processing. When obtaining the MIB through blind detection on the PBCH, the user equipment can obtain the accurate space level information based on a used decoding sequence. Therefore, the space level information can be transmitted by using a descrambling processing process, reducing signaling overheads.

With reference to the third aspect of this application, in a third implementation of the third aspect of this application, the preamble sequence information further includes space level information, and the space level information is used to indicate a quantity of code domain space layers of preamble sequence space;

the transmitter is configured to add the space level information in the preamble sequence information to a SIB; and the transmitter is configured to send the SIB over a PDSCH.

Before the user equipment performs random access, in a system message sent by the access network device to the user equipment, system information includes a MIB and a plurality of SIBs. There are a plurality of types of SIBs, and in the prior art, time-frequency resource information is indicated by using a field in a SIB 2. Therefore, the transmitter can still indicate the space level information in the preamble sequence information by using the field in the SIB 2. In this way, the SIB 2 carries the space level information, and the SIB 2 is sent to the user equipment over the PDSCH, so that after receiving the SIB 2, the user equipment can obtain the space level information by parsing the field in the SIB 2.

With reference to the first implementation of the third aspect, the second implementation of the third aspect, or the third implementation of the third aspect of this application, in a fourth implementation of the third aspect of this application, the preamble sequence information further includes time-frequency resource information, and the time-frequency resource information is used to indicate a time-frequency resource occupied by the preamble sequence space on a PRACH;

the processor is further configured to add the time-frequency resource information in the preamble sequence information to the SIB; and the transmitter is further configured to send the SIB over the PDSCH.

Before the user equipment performs random access, in a system message sent by the access network device to the user equipment, system information includes a MIB and a plurality of SIBs. There are a plurality of types of SIBs, and in the prior art, time-frequency resource information is indicated by using a field in a SIB 2. Therefore, to avoid additional workload, the processor still adds the time-frequency resource information to the SIB 2, and the transmitter sends the SIB 2 over the PDSCH.

With reference to the third aspect, the first implementation of the third aspect, the second implementation of the third aspect, the third implementation of the third aspect, or the fourth implementation of the third aspect of this application, in a fifth implementation of the third aspect of this application, the access network device further includes a receiver; and the receiver is specifically configured to obtain a preamble sequence space configuration parameter, where the preamble sequence space configuration parameter includes network load, a system parameter, and a quantity of user equipments.

Before the processor determines the preamble sequence information, the receiver needs to obtain the preamble sequence space configuration parameter. The preamble sequence space configuration parameter includes the network load, the system parameter, and the quantity of user equipments. The system parameter includes at least one of a user sequence length, a collision probability tolerance value, a residual probability tolerance value, a timing estimation error, a channel estimation error, a bit error rate, an available time-frequency resource size, an available computing resource size, received signal power, and a signal-to-noise ratio, so that the receiver can determine the preamble sequence information based on the preamble sequence space configuration parameter.

A fourth aspect of this application provides user equipment, including a receiver and a processor, where the receiver is connected to the processor;

the receiver is configured to obtain preamble sequence information sent by an access network device, where the preamble sequence information includes a message used to indicate a quantity of preamble sequences; and the processor is configured to perform random access based on the preamble sequence information.

When the user equipment performs random access, the user equipment needs to select one preamble sequence from a quantity of preamble sequences that is specified by the access network device and send the preamble sequence to the access network device. Before the preamble sequence is sent to the access network device, the receiver obtains the preamble sequence information sent by the access network device, and the processor performs random access based on the preamble sequence information. In this way, the user equipment can randomly access a communications network system successfully, reducing a probability of a random access failure.

With reference to the fourth aspect of this application, in a first implementation of the fourth aspect of this application, the preamble sequence information further includes space level information, and the space level information is used to indicate a quantity of code domain space layers of preamble sequence space; and the receiver is specifically configured to: perform blind detection on a PBCH to obtain a master system information block MIB, and determine the space level information based on a CRC code removed during the blind detection.

The preamble sequence information further includes the space level information, and a correspondence that is between space level information and a CRC design rule and that is known by both the user equipment and the access network device is preset, so that a different CRC code is generated based on different space level information to perform check processing on the MIB. When obtaining the MIB through blind detection on the PBCH, the receiver can obtain the accurate space level information based on the removed CRC code. Therefore, the space level information can be transmitted by using a check process, reducing signaling overheads.

With reference to the fourth aspect of this application, in a second implementation of the fourth aspect of this application, the preamble sequence information further includes space level information, and the space level information is used to indicate a quantity of code domain space layers of preamble sequence space; and the receiver is specifically configured to: perform blind detection on a PBCH to obtain a MIB, and determine the space level information based on a decoding sequence used during the blind detection.

The preamble sequence information further includes the space level information, and a correspondence that is between space level information and a descrambling design rule and that is known by both the user equipment and the access network device is preset, so that a different scrambling code sequence is generated based on different space level information to perform scrambling processing on the MIB. When obtaining the MIB through blind detection on the PBCH, the user equipment can obtain the accurate space level information based on the used decoding sequence.

Therefore, the space level information can be transmitted by using a descrambling processing process, reducing signaling overheads.

With reference to the fourth aspect of this application, in a third implementation of the fourth aspect of this application, the preamble sequence information further includes space level information, and the space level information is used to indicate a quantity of code domain space layers of preamble sequence space;

the receiver is configured to receive, over a physical downlink shared channel PDSCH, a system information block SIB sent by the access network device, where the SIB carries the space level information in the preamble sequence information; and the receiver is further configured to parse the SIB to obtain the space level information.

Before the user equipment performs random access, in a system message sent by the access network device to the user equipment, system information includes a MIB and a plurality of SIBs. There are a plurality of types of SIBs, and time-frequency resource information is usually indicated by using a field in a SIB 2. Therefore, the space level information in the preamble sequence information can still be indicated by using the field in the SIB 2. In this way, the SIB 2 carries the preamble sequence information, and the receiver receives, over the PDSCH, the SIB 2 sent by the access network device, and obtains the space level information by parsing the SIB 2.

With reference to the first implementation of the fourth aspect, the second implementation of the fourth aspect, or the third implementation of the fourth aspect of this application, in a fourth implementation of the fourth aspect of this application, the preamble sequence information further includes time-frequency resource information, and the time-frequency resource information is used to indicate a time-frequency resource occupied by the preamble sequence space on a PRACH;

the receiver is further configured to receive, over the PDSCH, the SIB sent by the access network device, where the SIB carries the time-frequency resource information in the preamble sequence information; and the receiver is further configured to parse the SIB to obtain the time-frequency resource information.

Before the user equipment performs random access, in a system message sent by the access network device to the user equipment, system information includes a MIB and a plurality of SIBs. There are a plurality of types of SIBs, and time-frequency resource information is usually indicated by using a field in a SIB 2. Therefore, to avoid additional workload, the time-frequency resource information is still carried in the SIB 2, and the receiver receives, over the PDSCH, the SIB 2 sent by the access network device, and can obtain the time-frequency resource information by parsing the SIB 2.

BRIEF DESCRIPTION OF DRAWINGS

To describe the technical solutions in the embodiments of this application more clearly, the following briefly describes the accompanying drawings required for describing the embodiments and the prior art. Apparently, the accompanying drawings in the following description show merely some embodiments of this application, and a person of ordinary skill in the art may still derive other drawings from these accompanying drawings without creative efforts.

FIG. 7 is a schematic diagram of a PBCH CRC code design rule;

DESCRIPTION OF EMBODIMENTS

This application provides a preamble sequence configuration method, user equipment, and an access network device. The access network device determines preamble sequence information and notifies the user equipment, and the user equipment determines optional preamble sequence space based on the preamble sequence information, so that the user equipment can randomly access a communications network system.

The following clearly and completely describes the technical solutions in this application with reference to the accompanying drawings in this application. Apparently, the described embodiments are merely some but not all of the embodiments of this application. All other embodiments obtained by a person skilled in the art based on the embodiments of this application without creative efforts shall fall within the protection scope of this application.

First, a system architecture or a scenario applied to this application is briefly described.

Figure 1:
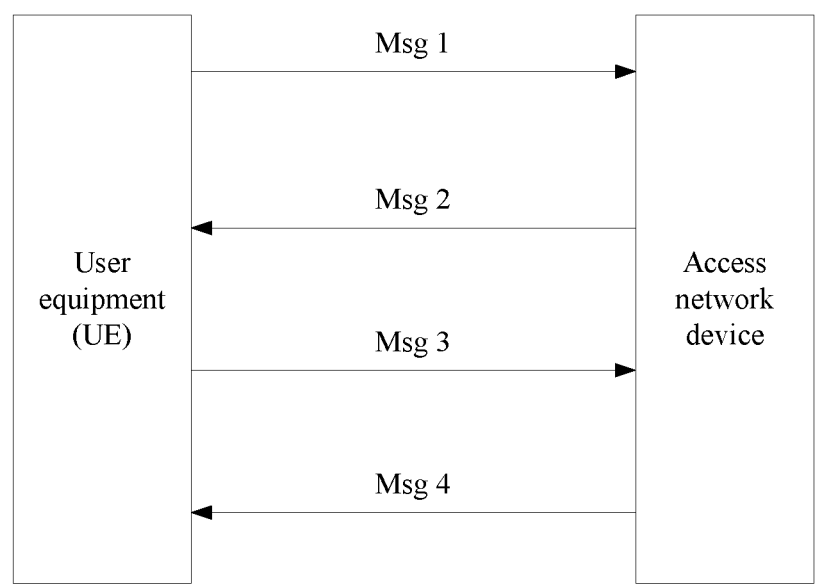
FIG. 1 is a schematic signaling flowchart of random access of user equipment.
Figure 2:
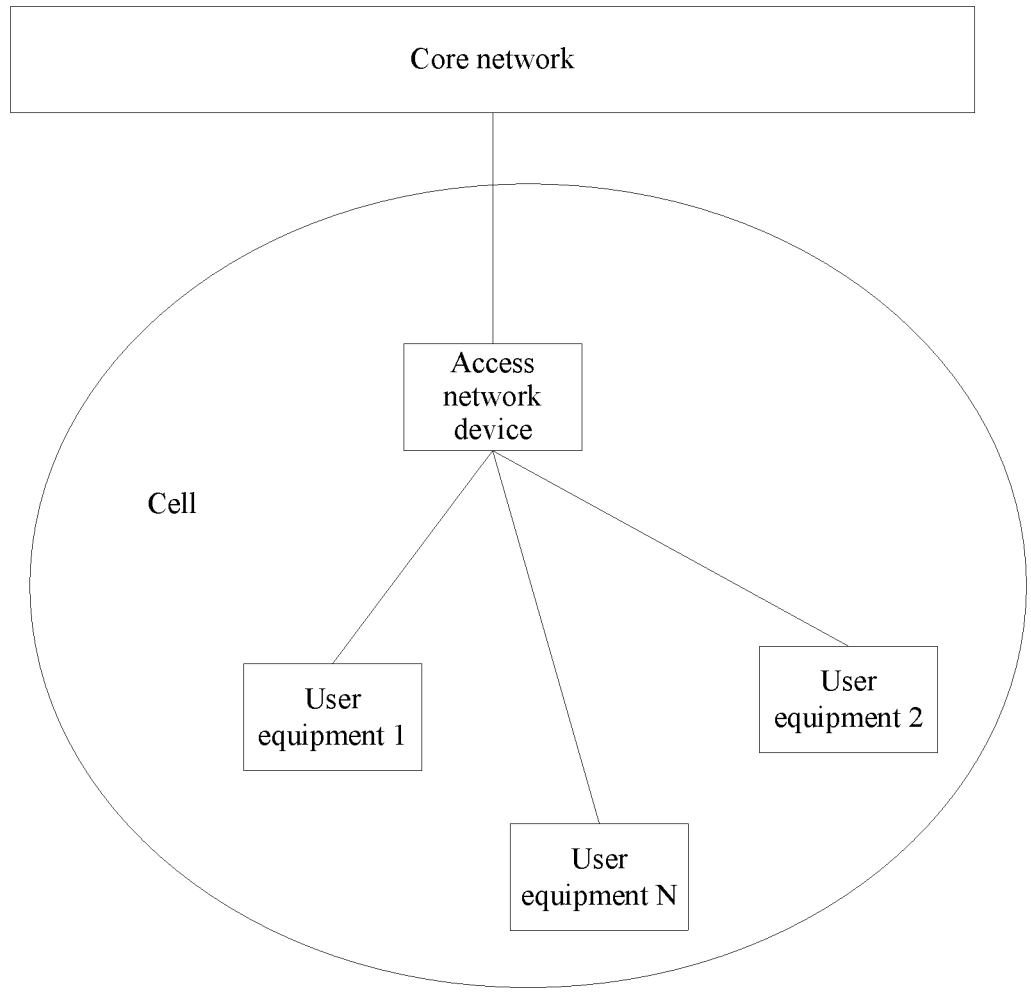
FIG. 2 is a schematic diagram of an application scenario or an architecture according to this application.

This application is applied to a wireless communications network system, and may be applied to an LTE system. As shown in FIG. 2, N user equipments access a core network by using an access network device, and the user equipments may be connected to the access network device in a wireless manner. The access network device may be a network device in a cell, or may be a base station in a cell or a network device that is in the cell and that has a function similar to that of the base station, such as a wireless router or a wireless access point (Access Point, AP). The access network device may be a network device providing wireless access and a communication service for mobile or fixed user equipment in a cell. All user equipments served by the access network device include user equipment connected to the access network device, user equipment that camps on a network provided by the access network device, and the like.

Before communicating with the access network device, user equipment UE needs to perform RA. Before RA, an LTE system needs to specify optional preamble sequence space on a PRACH, so that in an RA process, the UE selects, from the optional preamble sequence space, preamble sequence space carrying a preamble sequence, and can send the preamble sequence to an eNB successfully. The preamble sequence crosses time domain, frequency domain, and code domain, and the optional preamble sequence space includes time-frequency resource space and code domain space.

A resource used to resolve an RA conflict between a plurality of UEs includes both a PRACH time-frequency resource and a preamble sequence. In LTE, the PRACH and a physical uplink shared channel (Physical Uplink Shared Channel, PUSCH) and the PRACH and a physical uplink control channel (Physical Uplink Control Channel, PUCCH) are reused in both a time domain and a frequency domain. PRACH time-frequency resources are semi-statically distributed in a PUSCH range and periodically repeated. A PRACH resource configuration determines allocation of resources used for RA and data transmission. If more time-frequency resources are allocated to the PRACH, fewer time-frequency resources are used for data transmission. A preamble sequence may be used to differentiate different UEs on a same PRACH time-frequency resource. If more than one UE transmits a same preamble sequence on a same PRACH time-frequency resource, a random access conflict occurs, causing a random access failure. The preamble sequence in the LTE is obtained by performing cyclic shift on a ZC sequence. An LTE cell has 64 preamble sequences, some of the preamble sequences are used for non-contention-based RA, and less than 64 preamble sequences are used for contention-based RA. When a quantity of UEs is increased, especially in massive MTCs of the IoT, a base number of UEs is quite large. It is assumed that all preamble sequences are used for contention-based RA; however, the 64 preamble sequences are still quite few relative to the quantity of UEs. Therefore, a probability of an RA conflict is increased. In an existing solution, preamble sequences are planned based on a time-frequency resource. To decrease the probability of the RA conflict, preamble sequences may also be planned in code domain while time-frequency resource occupancy is not increased. To be specific, a new preamble sequence crosses time domain, frequency domain, and code domain. It is assumed that there are 64 preamble sequences at each layer. When code domain space is of one layer, there are 64 preamble sequences. When the code domain space is of two layers, there may be 128 preamble sequences. When the code domain space is of four layers, there are 256 preamble sequences. Each time the code domain space increases by one layer, an available quantity of preamble sequences increases by 64.

In an existing Long Term Evolution (Long Term Evolution, LTE) standard protocol, before sending the preamble sequence, the UE requires a system information block (System Information Block, SIB) 2 sent by the access network device on a broadcast channel (Broadcast Channel, BCH). System information obtained by the UE by using the SIB 2 includes an RA channel parameter, a preamble sequence format of a cell, a quantity of and sequence numbers of ZC (Zadoff-Chu) root sequences, the preamble sequence, implicit information, a correspondence between implicit information, a power incremental compensation (greater than or equal to 0 dB), and a maximum quantity of preamble sequence retransmission times.

The UE receives the system information block SIB 2 to obtain preamble sequence information. An available PRACH time-frequency resource of a cell corresponding to the access network device is determined based on prach-ConfigIndex and prach-FrequencyOffset fields in the SIB 2. For all UEs connected to the cell, once the two fields are determined, a preamble sequence format (format) and an optional PRACH resource are determined. PRACH configuration information in the SIB 2 is as follows:
  radioResourceConfigCommon: prach-Config
  rootSequenceIndex: 0x7%: This parameter is used to generate a logical Za-doff sequence index of a signature. Each logical index corresponds to one physical ZC sequence. The value is usually set based on a network planning configuration. Currently, the parameter is set to 7, and a corresponding physical ZC sequence is 629.
  prach-ConfigInfo
  prach-ConfigIndex: 0x6%: The value and the preamble sequence format are used together to determine a frequency domain/time domain resource of the preamble sequence. Currently, the parameter is set to 6, a corresponding preamble sequence format is 0, and a resource of subframe 1 or subframe 6 of any system frame may be occupied.
  highSpeedFlag: FALSE %: This parameter indicates a high-speed mobile cell flag, to be specific, whether a high-speed mobile scenario is included. Currently, the parameter is set to False, indicating that the high-speed mobile scenario is not included.
  zeroCorrelationZoneConfig: 0x2%: This parameter indicates a zero auto-correlation zone configuration index. A random access preamble sequence is generated from ZC sequence having a constant amplitude zero auto-correlation (CAZAC) characteristic. The random access preamble sequence is obtained by obtaining a physical root sequence by using a logical root sequence and then performing cyclic shift on the physical root sequence. The zero auto-correlation zone configuration index is directly correlated with an Ncs value, and ranges from 0 to 15. Currently, the parameter is set to 2, corresponding to Ncs=15 (an infinite set) or Ncs=22 (a finite set).
  prach-FreqOffset: 0x6%: This parameter indicates an offset value of a start location of a frequency domain resource occupied by each PRACH in a frequency division duplexing (Frequency Division Duplexing, FDD) cell.

When the UE initiates random access, an appropriate preamble sequence is selected based on a possible size of an RA process message, a possible path loss (path loss), and the like. The SIB 2 mainly has three parts of content, including common radio resource configuration information, a timer and a constant, and frequency information. In addition, the SIB 2 further includes cell access barring-related information. Existing SIB2 RACH configuration information is as follows:
  radioResourceConfigCommon: rach-ConfigCommon
  preambleInfo
  numberofRA-Preambles: n52%: This parameter indicates a quantity of preamble sequences reserved for contention-based RA. There are totally 64 PRACH preamble sequences. Currently, the parameter is set to 52, indicating that 52 preamble sequences are used for contention-based RA.
  preambleGroupAConfig
  sizeofRA-PreamblesGroupA: n28%: This parameter indicates a quantity of RA preamble sequences in a group A. Preamble sequences for contention-based RA are totally grouped into 2 groups: the group A and a group B. Currently, the parameter is set to 28. There are 28 preamble sequences in the group A, and there are 52−28=24 preamble sequences in the group B.
  messageSizeGroupA: b56%: This parameter indicates a threshold/bit for determining a size of a Msg 3 when the UE selects the group A of preamble sequences in a random access process. Currently, the parameter is set to 56. To be specific, when the size of the Msg 3 is less than 56 bits, the group A is selected.

messagePowerOffsetGroupB: dB10%: This parameter is used to select the group B of UE RA preamble sequences. A default value is 10 dB.

powerRampingParameters powerRampingStep: dB2%: This parameter indicates a power ramp step of the preamble sequence in the RA process. Currently, the parameter is set to dB2, that is, 2 dB.

preambleInitialReceivedTargetPower: dBm−104%: This parameter indicates initially-received target power of the preamble sequence. When a PRACH preamble format is 0, a target power level expected by the eNB meets preamble detection performance. Currently, the parameter is set to −104 dBm, that is, an expected power value, and is used to calculate an initial transmit power of the preamble sequence.

ra-SupervisionInfo preambleTransMax: n10%: This parameter indicates a maximum quantity of retransmission times of an RA preamble sequence. Currently, the parameter is set to 10. In other words, the maximum quantity of retransmission times is 10.

ra-ResponseWindowSize: sf10%: This parameter indicates a window for receiving a random response. If the RAR is not received in a window period, uplink synchronization fails. Currently, the parameter is set to sf10, that is, a length of 10 subframes.

mac-ContensionResolutionTimer: sf64%: This parameter indicates effective duration of waiting to receive a Msg 4 by the UE in the RA process. When the UE initially transmits or retransmits the Msg 3, a timer starts. If the UE receives a NACK feedback of the Msg 4 or the Msg 3 before timeout, the timer stops. If the timer times out, RA fails, and the UE re-performs RA. Currently, the parameter is set to sf64, that is, a length of 64 subframes.

maxHARQ-Msg3Tx: 0x5%: This parameter indicates a maximum quantity of hybrid automatic repeat request (Hybrid Automatic Repeat reQuest, HARQ) transmission times of the Msg 3. Currently, the parameter is set to 5, that is, 5 times.

It can be learned from the foregoing that the UE receives the system information block SIB 2 to obtain the preamble sequence information, and the available PRACH time-frequency resource (in other words, optional preamble sequence space) of a cell corresponding to the eNB is determined based on the prach-ConfigIndex and prach-FrequencyOffset fields in the SIB 2. It can be learned that the LTE system cannot notify the UE of the preamble sequence information in any way. Therefore, the UE cannot send a preamble sequence across time domain, frequency domain, and code domain.

The following describes, by using embodiments, a preamble sequence configuration method exchanged between an access network device and user equipment in the foregoing system architecture or scenario.

Figure 3:
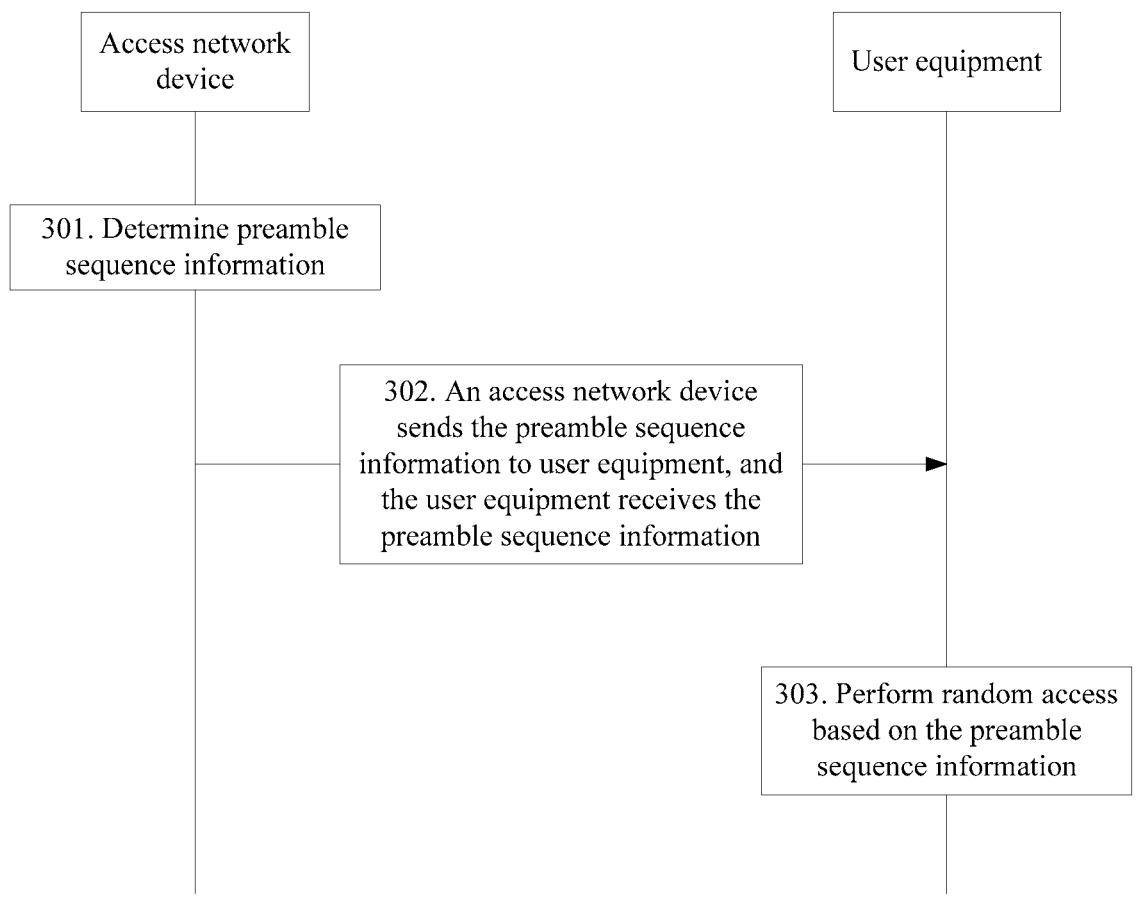
FIG. 3 is a schematic flowchart of an embodiment of a preamble sequence configuration method according to this application.

Referring to FIG. 3, an embodiment of this application provides a preamble sequence configuration method. The method includes the following steps.

301. An access network device determines preamble sequence information.

In this embodiment, before accessing the access network device, user equipment needs to perform RA. Before RA, the access network device determines the preamble sequence information based on a preamble sequence space configuration parameter. The preamble sequence information includes a message used to indicate a quantity of preamble sequences.

302. The access network device sends the preamble sequence information to user equipment, and the user equipment receives the preamble sequence information.

In this embodiment, after the access network device determines the preamble sequence information, the user equipment does not know the preamble sequence information, and cannot send a preamble sequence in an RA process. Therefore, the access network device needs to send the preamble sequence information to the user equipment over a channel such as a PBCH or a PDSCH, and the user equipment obtains, by using the channel such as the PBCH or the PDSCH, the preamble sequence information sent by the access network device.

303. The user equipment performs random access based on the preamble sequence information.

In this embodiment, the user equipment may select, based on the received preamble sequence information, one preamble sequence from a specified quantity of preamble sequences and send the preamble sequence to the access network device for random access.

In this embodiment of this application, when the user equipment performs random access, the user equipment needs to select one preamble sequence from the quantity of preamble sequences that is specified by the access network device and send the preamble sequence to the access network device. Before the preamble sequence is sent to the access network device, the access network device determines the preamble sequence information based on the preamble sequence space configuration parameter, where the preamble sequence information includes the message used to indicate a quantity of preamble sequences, and sends the preamble sequence information to the user equipment, so that the user equipment can perform random access based on the preamble sequence information. In this way, the user equipment can randomly access a communications network system successfully, reducing a probability of a random access failure.

In the foregoing embodiment, the preamble sequence information includes the message used to indicate a quantity of preamble sequences. The preamble sequence information further includes space level information, and the space level information is used to indicate a quantity of code domain space layers of preamble sequence space. It can be learned based on descriptions of the foregoing system architecture or scenario that, in the prior art, time-frequency resource information in the preamble sequence information is transmitted by using a SIB 2. The space level information may be included in the SIB 2 and sent to the user equipment in an explicit manner, or may be notified to the user equipment in an implicit manner. This is not specifically limited.

The following separately describes explicit transfer and implicit transfer of space level information by using embodiments.

Figure 4:
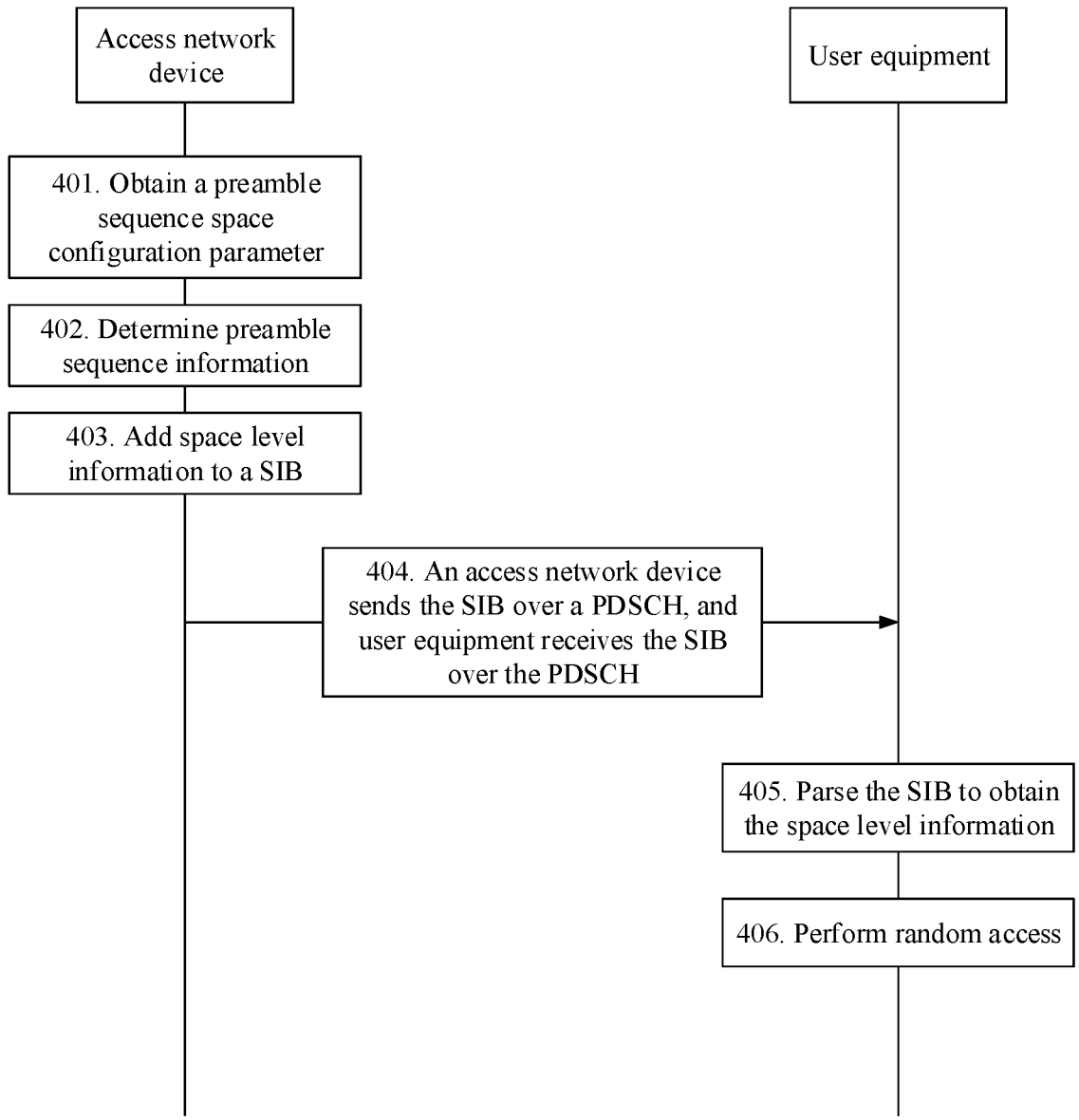
FIG. 4 is a schematic flowchart of another embodiment of a preamble sequence configuration method according to this application.

During specific implementation, an explicit transfer manner may be a manner of adding signaling to a SIB 2. Referring to FIG. 4, an embodiment of this application provides a preamble sequence configuration method. The method includes the following steps.

401. An access network device obtains a preamble sequence space configuration parameter.

In this embodiment, before determining preamble sequence space, the access network device needs to know a size of the preamble sequence space. In other words, a quantity of preamble sequences in the preamble sequence space, and therefore needs to obtain a preamble sequence space configuration parameter. Specifically, the access network device may collect a preamble sequence space configuration parameter in a particular period. The preamble sequence space configuration parameter includes network load, a system parameter, and a quantity of user equipments, and may further include parameters such as a quantity of access users, a system performance parameter, and a preamble sequence length. Optionally, the period may be a broadcast period.

402. The access network device determines preamble sequence information.

For details, refer to step 301. The preamble sequence information further includes space level information.

403. The access network device adds space level information in the preamble sequence information to a SIB.

In this embodiment, after the access network device determines the preamble sequence information, user equipment does not know the preamble sequence information, and cannot send a preamble sequence in an RA process. Therefore, the access network device needs to notify the user equipment of the preamble sequence information. In the prior art, time-frequency resource information of the preamble sequence space is indicated by using prach-ConfigIndex and prach-FrequencyOffset fields in a SIB 2. Therefore, the time-frequency resource information is still indicated by using the prach-ConfigIndex and prach-FrequencyOffset fields in the SIB 2, and a field is added to the SIB 2 to indicate the space level information (that is, a quantity of code domain space layers). In this embodiment, RACH configuration information in the SIB 2 is as follows:

radioResourceConfigCommon: rach-ConfigCommon
    preambleInfo
    numberofRA-PreamblesCode: nxx %: xx=1, 2, 3, . . . , N code domain space layers.
    numberofRA-Preambles: n52%: This parameter indicates a quantity of preamble sequences reserved for contention-based random access. There are totally 64 PRACH preamble sequences.
    preambleGroupAConfig
    sizeofRA-PreamblesGroupA: n28%: This parameter indicates a quantity of random access preamble sequences in a group A.
    messageSizeGroupA: b56%: This parameter indicates a threshold/bit for determining a size of a Msg 3 when the UE selects the group A of preambles in the random access process.
    messagePowerOffsetGroupB: dB10%: This parameter is used to select a group B of random access preambles for the UE.
    powerRampingParameters
    powerRampingStep: dB2%: This parameter indicates a power ramp step of a preamble sequence in the random access process. Currently, the parameter is set to dB2, that is, 2 dB.
    preambleInitialReceivedTargetPower: dBm−104%: This parameter indicates initially-received target power of the preamble sequence.
    ra-SupervisionInfo
    preambleTransMax: n10%: This parameter indicates a maximum quantity of times a random access preamble sequence is retransmitted.
    ra-ResponseWindowSize: sf10%: This parameter indicates a window for receiving a random response.
    mac-ContensionResolutionTimer: sf64%: This parameter indicates effective duration of waiting to receive a Msg 4 by the UE in the RA process.
    maxHARQ-Msg3Tx: 0x5%: This parameter indicates a maximum quantity of times HARQ of the Msg 3 is transmitted. Currently, this parameter is set to 5, that is, 5 times.

"numberofRA-PreamblesCode: nxx" in the third line is used to indicate a quantity of code domain space layers, n indicates a decimal digit, and xx indicates a specific quantity of space layers. The quantity of space levels is indicated by using a decimal digit, and no encoding is involved during the indication. When xx=1, xx is indicated as 00 in a binary form, corresponding to space at level 0. Assuming that each level of space includes 64 optional preamble sequences, 00 is corresponding to 64 optional preamble sequences. When xx=2, xx is indicated as 01 in a binary form, and a quantity of corresponding optional preamble sequences is 64*2=128. Similarly, when xx=4, xx is indicated as 11 in a binary form, and a quantity of corresponding optional preamble sequences is 64*4=256.

It needs to be noted that adding a field to the SIB 2 to indicate the space level information is merely one solution of this application. Alternatively, the preamble sequence information may be carried in another type of SIB. This is not specifically limited.

404. The access network device sends the SIB over a PDSCH, and user equipment receives the SIB over the PDSCH.

In this embodiment, after adding the space level information to the SIB 2, the access network device sends the SIB 2 over the PDSCH, and the user equipment receives, over the PDSCH, the SIB sent by the access network device, to obtain the SIB2 in the SIB.

405. The user equipment parses the SIB to obtain the space level information.

In this embodiment, the user equipment parses the field in the SIB 2, to obtain the preamble sequence information.

406. The user equipment performs random access based on the preamble sequence information.

For details, refer to step 303.

In this embodiment of this application, the access network device may indicate the space level information in the preamble sequence information by using the field in the SIB 2, to add the preamble sequence information to the SIB 2, and send the SIB 2 to the user equipment over the PDSCH, so that the user equipment can parse the field in the SIB 2 after receiving the SIB 2 in the SIB, to conveniently and quickly obtain the preamble sequence information.

Figure 5:
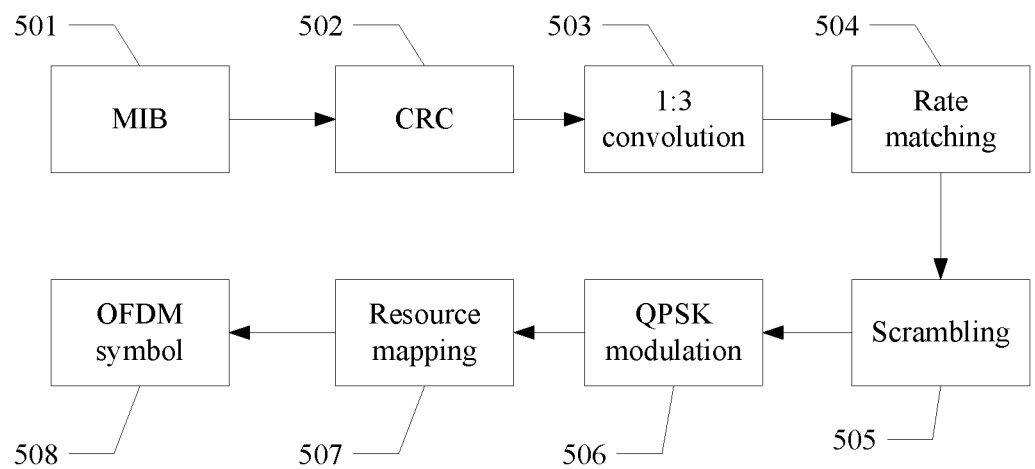
FIG. 5 is a schematic flowchart of MIB processing.

In the foregoing embodiment, the access network device notifies the user equipment by adding the space level information to the SIB. In this way, although the user equipment can conveniently and quickly obtain the space level information, signaling overheads are increased at the same time because a field is added to the SIB 2 to indicate the space level information. To avoid increasing signaling overheads during space level information transmission, information transferring can be implemented only during processing of a MIB in system information. FIG. 5 shows processing steps that are before an access network device sends a MIB. Details are as follows:

Step 501: In an LTE system, the access network device transmits, to user equipment over a PBCH, basic information required by the system, where the basic information is included in a MIB, and therefore the access network device needs to generate the MIB. This belongs to the prior art, and therefore no detailed descriptions are provided. The MIB includes a limited quantity of most important and most frequently-used transmission parameters.

Step 502: Use a preset CRC code to perform check processing on the MIB, to be specific, add the CRC code after the MIB, to ensure that data of the MIB is correct in a transmission process, and the user equipment needs to accurately remove the CRC code during blind detection, to obtain the MIB.

Step 503: In the LTE system, usually use a 1:3 convolution manner to process the MIB, in other words, a ratio of a quantity of bits before encoding to a quantity of bits after the encoding is 1/3, to increase a redundant bit, and improve check performance.

Step 504: Based on an actual bearer capability of the PBCH, a rate of sending the MIB needs to be adjusted, to match with the bearer capability of the PBCH.

Step 505: Use a preset scrambling code sequence to perform scrambling processing on the MIB for encryption, and the user equipment can obtain the MIB by using a corresponding decoding sequence.

Step 506: Use a quadrature phase shift keying (Quadrature Phase Shift Keying, QPSK) modulation manner to perform digital modulation on the MIB.

Step 507: Place the MIB that has undergone QPSK modulation at a corresponding time-frequency resource location on the PBCH.

Step 508: Finally form an orthogonal frequency division multiplexing (Orthogonal Frequency Division Multiplexing, OFDM) symbol, in other words, the MIB is included in the OFDM symbol for sending.

It can be learned from analysis of the foregoing steps that the CRC code and the decoding sequence/scrambling code sequence that are respectively used in step 502 and step 505 may be changed manually, and may be used to transmit space level information in an implicit manner.

Transmission of space level information by using a CRC code and a decoding sequence/scrambling code sequence is separately described in detail below.

(1) Space level information is transmitted by using a CRC code.

Figure 6:
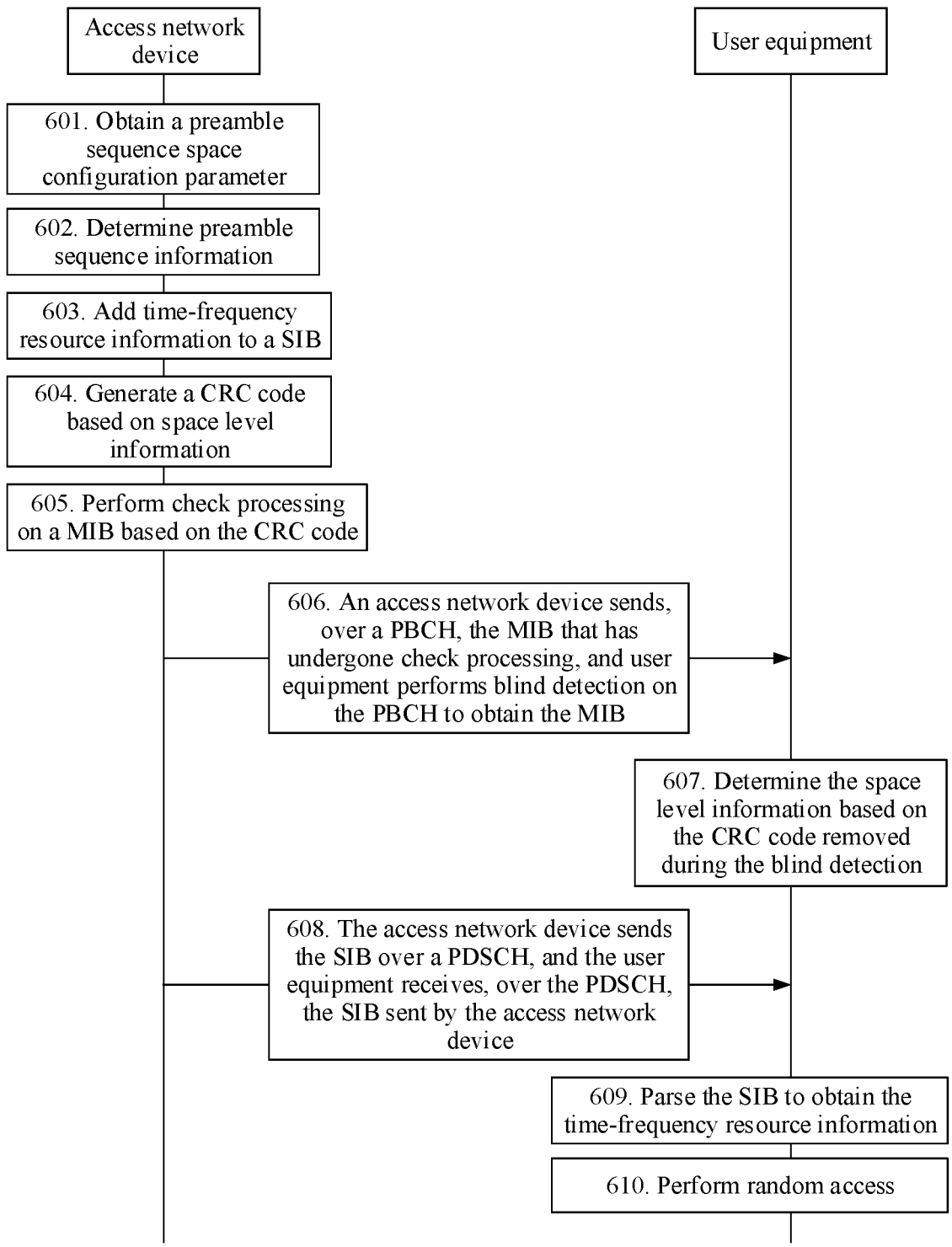
FIG. 6 is a schematic flowchart of still another embodiment of a preamble sequence configuration method according to this application.

Referring to FIG. 6, an embodiment of this application provides a preamble sequence configuration method. The method includes the following steps.

601. An access network device obtains a preamble sequence space configuration parameter.

For details, refer to step 401.

602. The access network device determines preamble sequence information.

For details, refer to step 402. The preamble sequence information further includes time-frequency resource information.

603. The access network device adds time-frequency resource information in the preamble sequence information to a SIB.

In the prior art, time-frequency resource information of the preamble sequence space is indicated by using prach-ConfigIndex and prach-FrequencyOffset fields in a SIB 2. In this embodiment, the time-frequency resource information is still indicated by using the prach-ConfigIndex and prach-FrequencyOffset fields in the SIB 2, and using the existing manner can avoid additional workload of the access network device.

604. The access network device generates a CRC code based on space level information.

In this embodiment, an existing CRC code is shown in FIG. 7. There are mainly three types of CRC codes that correspond to one antenna port, two antenna ports, and four antenna ports, respectively. When a CRC design rule is formulated, it is better to design a CRC code that is still 16 bits, so as to facilitate subsequent channel encoding and rate matching operations. However, the CRC code is not limited to 16 bits. There needs to be a correspondence between a CRC design rule and space level information, and the correspondence is known by both user equipment and the access network device. For example, the space level information indicates that there are four code domain space layers, and a CRC code generated according to a corresponding CRC design rule is (0,0,0,0,0,0,0,0,0,0,0,0,0,0,1,1); or there are three code domain space layers, and a corresponding CRC code is (0,0,0,0,0,0,0,0,0,0,0,0,0,1,0). The CRC code may be in a plurality of specific representation forms. There may be totally $2^{16}$ types of 16-bit CRC codes, and therefore the CRC design rule may be selected from $2^{16}$ manners. The access network device determines the corresponding CRC design rule based on the space level information, and generates the CRC code according to the CRC design rule.

605. The access network device performs check processing on a MIB based on the CRC code.

In this embodiment, the access network device performs check processing on the MIB, and adds the CRC code after the MIB.

606. The access network device sends, over a PBCH, the MIB that has undergone check processing, and user equipment performs blind detection on the PBCH to obtain the MIB.

In this embodiment, the access network device performs the foregoing processing of step 503 to step 508 on the MIB that has undergone check processing, adds the MIB to an OFDM symbol, and sends the OFDM symbol over the PBCH, and the user equipment performs blind detection on the OFDM symbol on the PBCH to obtain the MIB.

607. The user equipment determines the space level information based on the CRC code removed during the blind detection.

In this embodiment, there needs to be a correspondence between the CRC design rule and the space level information, and the correspondence is known by both the user equipment and the access network device. Therefore, when obtaining the MIB through blind detection on the OFDM symbol on the PBCH, the user equipment can determine the corresponding CRC design rule based on the removed CRC code, and can obtain the space level information based on the correspondence between the CRC design rule and the space level information.

608. The access network device sends the SIB over a PDSCH, and the user equipment receives, over the PDSCH, the SIB sent by the access network device.

In this embodiment, the access network device sends the SIB over the PDSCH, where the SIB includes a SIB 2, and the user equipment receives, over the PDSCH, the SIB sent by the access network device.

609. The user equipment parses the SIB to obtain the time-frequency resource information.

In this embodiment, after receiving the SIB, the user equipment parses the SIB 2 in the SIB, to obtain the time-frequency resource information.

610. The user equipment performs random access based on the preamble sequence information.

For details, refer to step 303.

In the prior art, time-frequency resource information is indicated by using the fields in the SIB 2. In this embodiment of this application, the time-frequency resource information is still carried in the SIB 2, and the correspondence that is between the space level information and the CRC design rule and that is known by both the user equipment and the access network device is preset. In this way, a different CRC code is generated based on different space level information to perform check processing on the MIB. When obtaining the MIB through blind detection on the PBCH, the user equipment can obtain the accurate space level information based on the removed CRC code. Therefore, the space level information can be transmitted by using a check process, reducing signaling overheads.

It needs to be noted that a sequence of step 606 and step 608 is not limited; however, step 607 needs to be performed after step 606, and step 609 needs to be performed after step 608.

(2) Space level information is transmitted by using a decoding sequence/scrambling code sequence.

Figure 8:
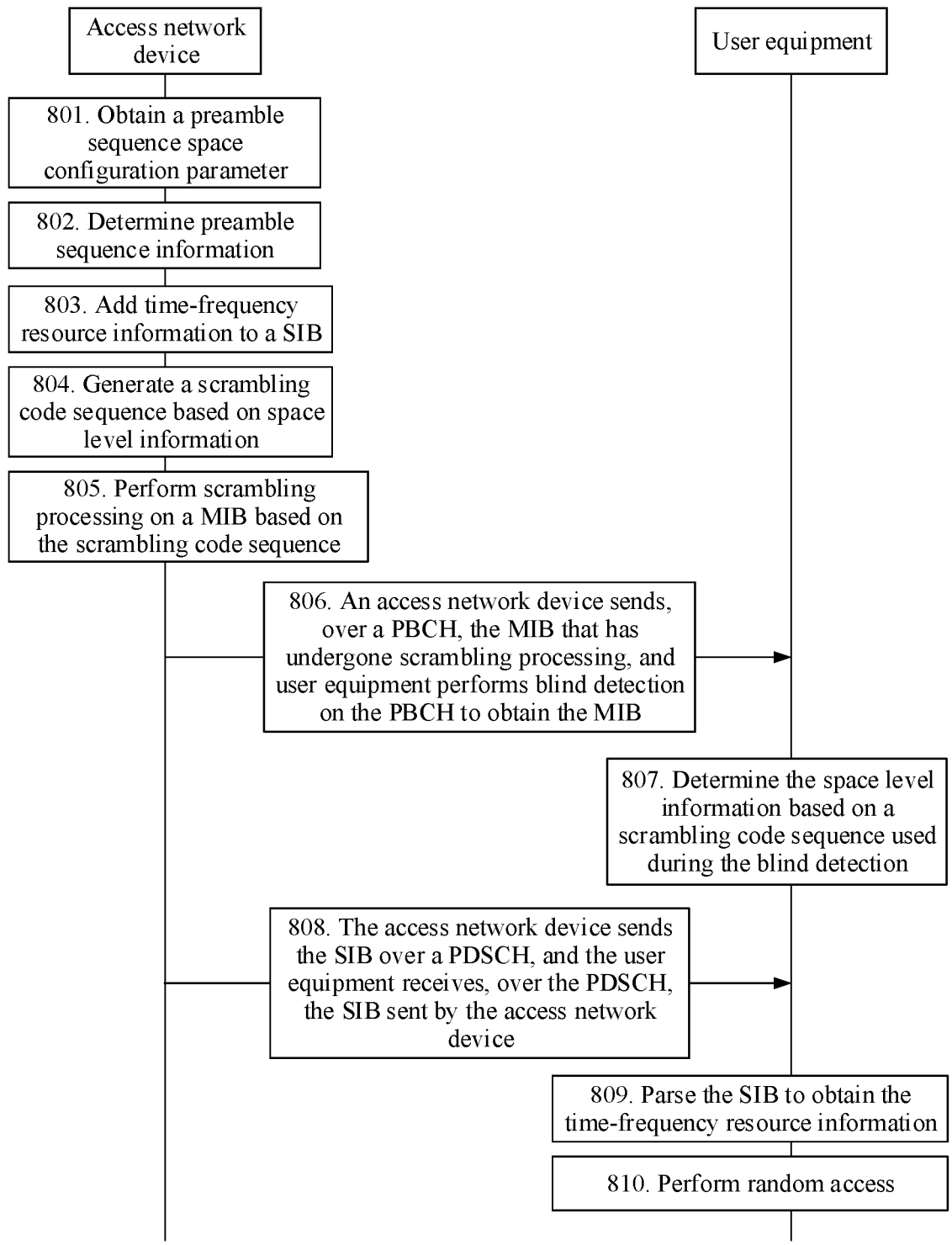
FIG. 8 is a schematic flowchart of still another embodiment of a preamble sequence configuration method according to this application.

Referring to FIG. 8, a preamble sequence configuration method in an embodiment of this application includes the following steps.

801. An access network device obtains a preamble sequence space configuration parameter.

For details, refer to step 601.

802. The access network device determines preamble sequence information.

For details, refer to step 602.

803. The access network device adds time-frequency resource information in the preamble sequence information to a SIB.

For details, refer to step 603.

804. The access network device generates a scrambling code sequence based on space level information.

In this embodiment, in existing LTE, a scrambling code is a Gold code whose order is 31 and that is generated by using a cell ID as an initial value. A sequence having different code phases is used as a scrambling code sequence. There are four code phases (0, 1, 2, and 3) corresponding to four segments of 40 ms. Original four code phases correspond to code domain space at level 0. When a descrambling design rule is formulated, a code phase of a generated scrambling code sequence not only corresponds to a PBCH sending period that is 40 ms, but also corresponds to space level information. A correspondence between a code phase design scheme and space level information is shown in Table 1.

TABLE 1

| Initial code phase | 0, 1, 2, and 3 | Space at level 0, and 64 optional preamble sequences |
|---|---|---|
| Code phase design 1 | 4, 5, 6, and 7 | Space at level 0 and level 1, and 128 optional preamble sequences |
| Code phase design 2 | 8, 9, 10, and 11 | Space at level 0, level 1, and level 2, and 192 optional preamble sequences |
| Code phase design 3 | 12, 13, 14, and 15 | Space at level 0, level 1, level 2, and level 3, and 256 optional preamble sequences |
| ... | ... | ... |

The initial code phase scheme indicates that, in the prior art, a scrambling code sequence has four initial code phases (0, 1, 2, and 3) and corresponding space level information is space at level 0 (to be specific, there is only one code domain space layer). The code phase design 1 indicates that a scrambling code sequence in this application has four code phases (4, 5, 6, and 7) and space level information corresponding to the four code phases is space at level 0 and level 1 (to be specific, there are two code domain space layers). Likewise, the code phase design 2 indicates that space level information is three code domain space layers, and the code phase design 3 indicates that space level information is four code domain space layers. The code phase design scheme is a descrambling design rule.

As shown in Table 2, there is another code phase design manner. A common place between this manner and the code phase design manner in Table 1 is that a scrambling code sequence having four different code phases is designed in a PBCH sending period that is 40 ms, to indicate different space level information.

The access network device determines a corresponding code phase design scheme based on a quantity of code domain space layers that is indicated by the space level information, where the code phase design scheme is a descrambling design rule, generates, based on the descrambling design rule, the scrambling code sequence having four different code phases, where the descrambling design rule is known by both user equipment and the access network device.

In addition to descrambling design rules of the foregoing two code phase design manners, other code phase design manners may be used. This is not specifically limited.

TABLE 2

| Initial code phase | 0, 1, 2, and 3 | Space at level 0, and 64 optional preamble sequences |
|---|---|---|
| Code phase design 1 | 0, 2, 4, and 6 | Space at level 0 and level 1, and 128 optional preamble sequences |
| Code phase design 2 | 0, 3, 6, and 9 | Space at level 0, level 1, and level 2, and 192 optional preamble sequences |
| Code phase design 3 | 0, 4, 8, and 12 | Space at level 0, level 1, level 2, and level 3, and 256 optional preamble sequences |
| ... | ... | ... |

805. The access network device performs scrambling processing on a MIB based on the scrambling code sequence.

In this embodiment, the access network device performs scrambling processing on the MIB based on the generated scrambling code sequence. A process of performing scrambling processing based on the scrambling code sequence is the same as a process in the prior art, and therefore no specific descriptions are provided herein.

806. The access network device sends, over a PBCH, the MIB that has undergone scrambling processing, and user equipment performs blind detection on the PBCH to obtain the MIB.

In this embodiment, the access network device performs processing of step 506 to step 508 on the MIB that has undergone scrambling processing, adds the MIB that has undergone scrambling processing to an OFDM symbol, and sends the OFDM symbol over the PBCH, and the user equipment performs blind detection on the OFDM symbol on the PBCH to obtain the MIB.

807. The user equipment determines the space level information based on a decoding sequence used during the blind detection.

In this embodiment, there needs to be a correspondence between the descrambling design rule and the space level information, and the correspondence is known by both the user equipment and the access network device. Therefore, when obtaining the MIB through blind detection on the OFDM symbol on the PBCH, the user equipment can determine the corresponding descrambling design rule based on the decoding sequence (corresponding to the scrambling code sequence in step 804) used during the blind detection, and can obtain the space level information based on the correspondence between the descrambling design rule and the space level information.

808. The access network device sends the SIB over a PDSCH, and the user equipment receives, over the PDSCH, the SIB sent by the access network device.

For details, refer to step 608.

809. The user equipment parses the SIB to obtain the time-frequency resource information.

For details, refer to step 609.

810. The user equipment performs random access based on the preamble sequence information.

For details, refer to step 303.

In the prior art, time-frequency resource information is indicated by using a field in a SIB 2. In this embodiment of this application, the time-frequency resource information is still carried in the SIB 2, and the correspondence that is between the space level information and the descrambling design rule and that is known by both the user equipment and the access network device is preset. In this way, a different scrambling code sequence is generated based on different space level information to perform scrambling processing on the MIB. When obtaining the MIB through blind detection on the PBCH, the user equipment can obtain the accurate space level information based on the decoding sequence used during the blind detection. Therefore, the space level information can be transmitted by using a descrambling processing process, reducing signaling overheads.

It needs to be noted that a sequence of step 806 and step 808 is not limited; however, step 707 needs to be performed after step 806, and step 809 needs to be performed after step 808.

It needs to be noted that the CRC code and the decoding sequence/scrambling code sequence are used in (1) and (2), respectively, to transmit the space level information. In a specific implementation process, the CRC code and the decoding sequence/scrambling code sequence may also be used at the same time to transmit the space level information. In other words, there is a correspondence between the CRC design rule and the space level information and between the descrambling design rule and the space level information. For example, space level information is space at level 0, level 1, and level 2 (three layers), a generated CRC code is (1,0,0,0,0,0,0,0,0,0,0,0,0,0,0,1), and four code phases of a scrambling code sequence are (0, 1, 3, and 5). When performing blind detection, the user terminal can obtain the corresponding space level information based on the removed CRC code and the decoding sequence.

In the foregoing embodiments, the preamble sequence configuration method is described. In the following embodiments, an access network device and user equipment are separately described.

Figure 9:
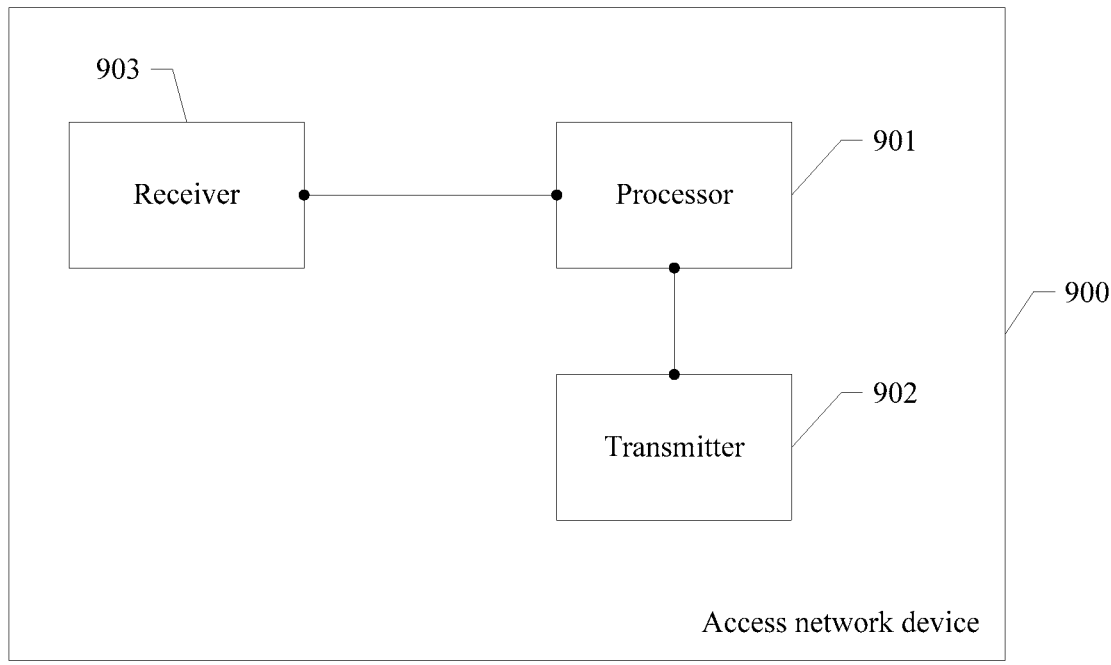
FIG. 9 is a schematic structural diagram of an embodiment of an access network device according to this application.

Referring to FIG. 9, an embodiment of this application provides an access network device, including:

a processor 901, configured to determine preamble sequence information, where the preamble sequence information includes a message used to indicate a quantity of preamble sequences; and a transmitter 902, configured to send the preamble sequence information to user equipment, where the preamble sequence information is used by the user equipment for random access.

In this embodiment of this application, the processor 901 determines the preamble sequence information based on a preamble sequence space configuration parameter, where the preamble sequence information includes the message used to indicate a quantity of preamble sequences; and the transmitter 902 sends the preamble sequence information to the user equipment, so that the user equipment can perform random access based on the preamble sequence information. In this way, the user equipment can randomly access a communications network system successfully, reducing a probability of a random access failure.

Optionally, in some embodiments of this application, the preamble sequence information further includes space level information, and the space level information is used to indicate a quantity of code domain space layers of preamble sequence space.

The processor 901 is further configured to generate a CRC code based on the space level information.

The processor 901 is further configured to perform check processing on a MIB based on the CRC code.

The transmitter 902 is configured to send, over a PBCH, the MIB that has undergone check processing.

In this embodiment of this application, the preamble sequence information includes the space level information, and a correspondence that is between space level information and a CRC design rule and that is known by both the user equipment and the access network device is preset, so that the processor 901 generates a different CRC code based on different space level information to perform check processing on the MIB, the transmitter 902 sends, over the PBCH, the MIB that has undergone check processing. When obtaining the MIB through blind detection on the PBCH, the user equipment can obtain the accurate space level information based on the removed CRC code. Therefore, the space level information can be transmitted by using a check process, reducing signaling overheads.

Optionally, in some embodiments of this application, the preamble sequence information further includes space level information, and the space level information is used to indicate a quantity of code domain space layers of preamble sequence space.

The processor 901 is further configured to generate a scrambling code sequence based on the space level information.

The processor 901 is further configured to perform scrambling processing on a MIB based on the scrambling code sequence.

The transmitter 902 is configured to send, over a PBCH, the MIB that has undergone scrambling processing.

In this embodiment of this application, the preamble sequence information includes the space level information, and a correspondence that is between space level information and a descrambling design rule and that is known by both the user equipment and the access network device is preset, so that the processor 901 generates a different scrambling code sequence based on different space level information to perform scrambling processing on the MIB, the transmitter 902 sends, over the PBCH, the MIB that has undergone check processing. When obtaining the MIB through blind detection on the PBCH, the user equipment can obtain the accurate space level information based on a used decoding sequence. Therefore, the space level information can be transmitted by using a descrambling processing process, reducing signaling overheads.

Optionally, in some embodiments of this application, the preamble sequence information further includes space level information, and the space level information is used to indicate a quantity of code domain space layers of preamble sequence space.

The transmitter 902 is configured to add the space level information in the preamble sequence information to a SIB.

The transmitter 902 is configured to send the SIB over a PDSCH.

In this embodiment of this application, before the user equipment performs RA, in a system message sent by the access network device to the user equipment, system information includes a MIB and a plurality of SIBs. There are a plurality of types of SIBs, and in the prior art, time-frequency resource information is indicated by using a field in a SIB 2. Therefore, the transmitter 902 can still indicate the space level information in the preamble sequence information by using the field in the SIB 2. In this way, the space level information is carried in the SIB 2, and the SIB 2 is sent to the user equipment over the PDSCH, so that after receiving the SIB 2, the user equipment can obtain the space level information by parsing the field in the SIB 2.

Optionally, in some embodiments of this application, the preamble sequence information includes time-frequency resource information, and the time-frequency resource information is used to indicate a time-frequency resource occupied by the preamble sequence space on a PRACH.

The processor 901 is configured to add the time-frequency resource information in the preamble sequence information to the SIB.

The transmitter 902 is configured to send the SIB over the PDSCH.

In this embodiment of this application, before the user equipment performs RA, in a system message sent by the access network device to the user equipment, system information includes a MIB and a plurality of SIBs. There are a plurality of types of SIBs, and in the prior art, time-frequency resource information is indicated by using a field in a SIB 2. Therefore, to avoid additional workload, the processor 901 still adds the time-frequency resource information to the SIB 2, and the transmitter 902 sends the SIB 2 over the PDSCH.

Optionally, in some embodiments of this application, the access network device further includes a receiver 903.

The receiver 903 is specifically configured to obtain a preamble sequence space configuration parameter. The preamble sequence space configuration parameter includes network load, a system parameter, and a quantity of user equipments.

Figure 10:
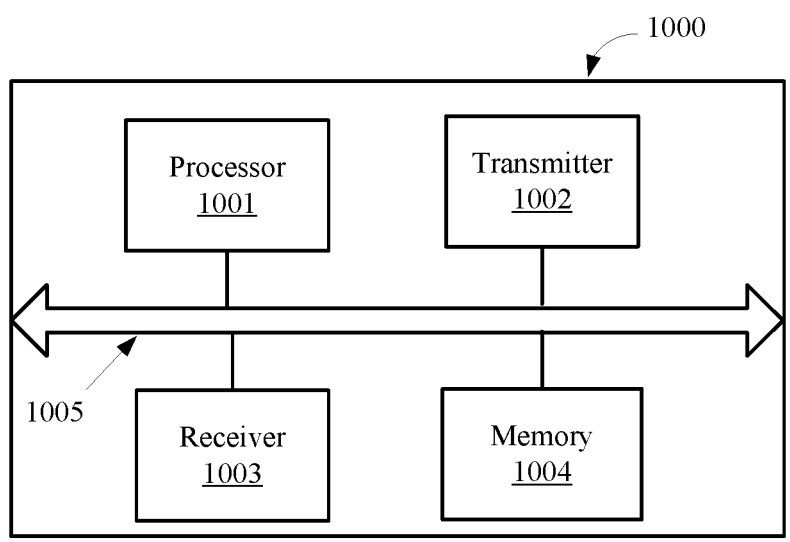
FIG. 10 is a schematic structural diagram of another embodiment of an access network device according to this application.

It should be noted that, as shown in FIG. 10, an access network device 1000 may include a processor 1001, a transmitter 1002, a receiver 1003, and a memory 1004. The memory 1004 may be configured to store code to be executed by the processor 1001, and the like.

Components of the access network device 1000 are coupled by using a bus system 1005. The bus system 1005 not only includes a data bus, but also includes a power bus, a control bus, and a status signal bus.

The access network device 900 shown in FIG. 9 or the access network device 1000 shown in FIG. 10 can implement processes implemented by the access network device in the foregoing preamble sequence configuration method embodiments. To avoid repetition, details are not described herein again.

It should be noted that the foregoing method embodiments in this application may be applied to the processor or implemented by the processor. The processor may be an integrated circuit chip, and has a signal processing capability. In an implementation process, steps of the foregoing method embodiments may be implemented by using an integrated logical circuit of hardware in the processor or an instruction in a form of software. The processor may be a general purpose processor, a digital signal processor (digital signal processor, DSP), an application-specific integrated circuit (application specific integrated circuit, ASIC), a field programmable gate array (field programmable gate array, FPGA), or another programmable logic device, a discrete gate or a transistor logic device, or a discrete hardware component. The processor may implement or perform all methods, steps, and logical block diagrams disclosed in the embodiments of this application. The general purpose processor may be a microprocessor, or the processor may be any conventional processor or the like. The steps of the methods disclosed with reference to the embodiments of this application may be directly implemented by a hardware decoding processor, or may be implemented by using a combination of hardware and software modules in a decoding processor. The software module may be located in a mature storage medium in the field such as a random access memory, a flash memory, a read-only memory, a programmable read-only memory, an electrically erasable programmable memory, or a register. The storage medium is located in a memory. The processor reads information in the memory and completes the steps of the foregoing methods with reference to the hardware of the processor.

It may be understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external high-speed cache. It should be noted as an example but not a limitation that there are a large number of forms of RAMs that are available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct memory bus random access memory (direct rambus RAM, DR RAM). It should be noted that the memory in a system and the method that are described in this specification is intended to include but is not limited to these memories and any other applicable types of memories.

Figure 11:
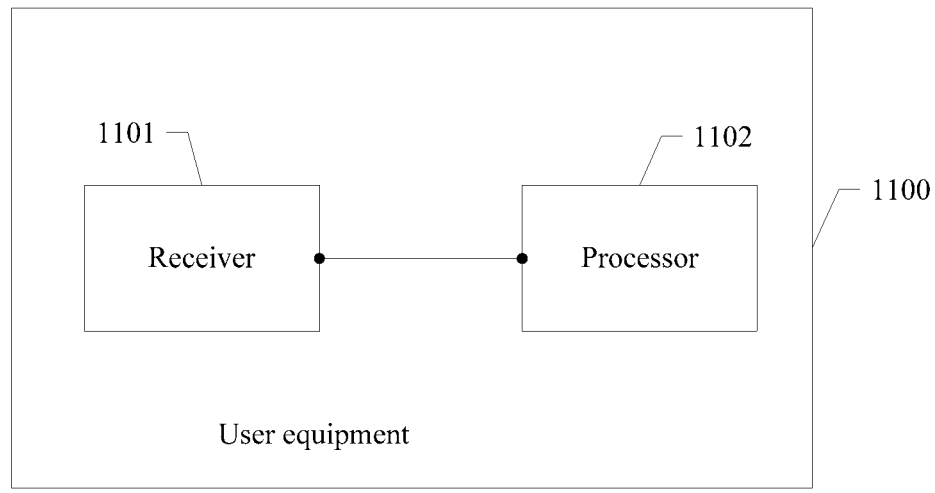
FIG. 11 is a schematic structural diagram of an embodiment of user equipment according to this application.

Referring to FIG. 11, an embodiment of this application provides user equipment, including:

a receiver 1101, configured to obtain preamble sequence information sent by an access network device, where the preamble sequence information includes a message used to indicate a quantity of preamble sequences; and a processor 1102, configured to perform random access based on the preamble sequence information.

In this embodiment of this application, before the user equipment performs random access, the receiver 1101 obtains the preamble sequence information sent by the access network device, where the preamble sequence information includes the message used to indicate a quantity of preamble sequences, and the processor 1102 performs random access based on the preamble sequence information. In this way, the user equipment can randomly access a communications network system successfully, reducing a probability of a random access failure.

Optionally, in some embodiments of this application, the preamble sequence information further includes space level information, and the space level information is used to indicate a quantity of code domain space layers of preamble sequence space.

The receiver 1101 is specifically configured to: perform blind detection on a PBCH to obtain a MIB, and determine the space level information based on a CRC code removed during the blind detection.

In this embodiment of this application, the preamble sequence information further includes the space level information, and a correspondence that is between space level information and a CRC design rule and that is known by both the user equipment and the access network device is preset, so that a different CRC code is generated based on different space level information to perform check processing on the MIB. When obtaining the MIB through blind detection on the PBCH, the receiver 1101 can obtain the accurate space level information based on the removed CRC code. Therefore, the space level information can be transmitted by using a check process, reducing signaling overheads.

Optionally, in some embodiments of this application, the preamble sequence information further includes space level information, and the space level information is used to indicate a quantity of code domain space layers of preamble sequence space.

The receiver 1101 is specifically configured to: perform blind detection on a PBCH to obtain a MIB, and determine the space level information based on a decoding sequence used during the blind detection.

In this embodiment of this application, the preamble sequence information further includes the space level information, and a correspondence that is between space level information and a descrambling design rule and that is known by both the user equipment and the access network device is preset, so that a different scrambling code sequence is generated based on different space level information to perform scrambling processing on the MIB. When obtaining the MIB through blind detection on the PBCH, the receiver 1101 can obtain the accurate space level information based on the used decoding sequence. Therefore, the space level information can be transmitted by using a descrambling processing process, reducing signaling overheads.

Optionally, in some embodiments of this application, the preamble sequence information includes space level information, and the space level information is used to indicate a quantity of code domain space layers of preamble sequence space.

The receiver 1101 is configured to receive, over a PDSCH, a SIB sent by the access network device, where the SIB carries the space level information in the preamble sequence information.

The receiver 1101 is further configured to parse the SIB to obtain the space level information.

In this embodiment of this application, before the user equipment performs RA, in a system message sent by the access network device to the user equipment, system information includes a MIB and a plurality of SIBs. There are a plurality of types of SIBs, and in the prior art, time-frequency resource information is indicated by using a field in a SIB 2. Therefore, the space level information in the preamble sequence information can still be indicated by using the field in the SIB 2. In this way, the SIB 2 carries the preamble sequence information, and the receiver 1101 receives, over the PDSCH, the SIB 2 sent by the access network device, and obtains the space level information and the time-frequency resource information by parsing the SIB 2. Therefore, the preamble sequence information can be obtained conveniently and quickly.

Optionally, in some embodiments of this application, the preamble sequence information further includes time-frequency resource information, and the time-frequency resource information is used to indicate a time-frequency resource occupied by the preamble sequence space on a PRACH.

The receiver 1101 is configured to receive, over the PDSCH, the SIB sent by the access network device, where the SIB carries the time-frequency resource information in the preamble sequence information.

The receiver 1101 is further configured to parse the SIB to obtain the time-frequency resource information.

In this embodiment of this application, before the user equipment performs RA, in a system message sent by the access network device to the user equipment, system information includes a MIB and a plurality of SIBs. There are a plurality of types of SIBs, and in the prior art, time-frequency resource information is indicated by using a field in a SIB 2. Therefore, to avoid additional workload, the time-frequency resource information is still carried in the SIB 2, and the receiver 1101 receives, over the PDSCH, the SIB 2 sent by the access network device, and can obtain the time-frequency resource information through parsing.

Figure 12:
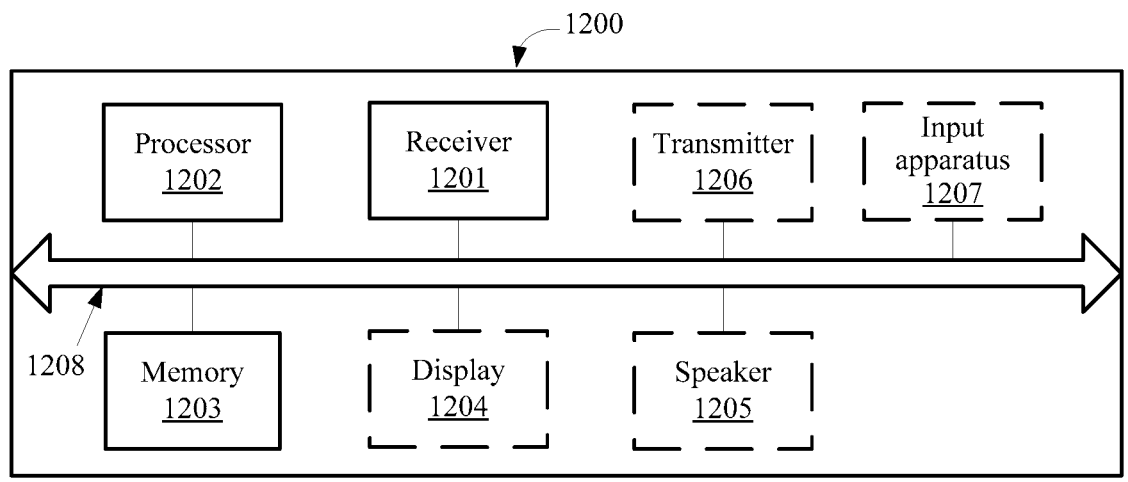
FIG. 12 is a schematic structural diagram of another embodiment of user equipment according to this application.

It should be noted that, as shown in FIG. 12, user equipment 1200 may include a processor 1202, a receiver 1201, a memory 1203, a display 1204, a speaker 1205, a transmitter 1206, an input apparatus 1207, and the like. The memory 1203 may be configured to store code to be executed by the processor 1202, and the like.

Components of the user equipment 1200 are coupled by using a bus system 1208. The bus system 1204 not only includes a data bus, but also includes a power bus, a control bus, and a status signal bus.

The access network device 1100 shown in FIG. 11 or the access network device 1200 shown in FIG. 12 can implement processes implemented by the user equipment in the foregoing preamble sequence space configuration method embodiments. To avoid repetition, details are not described herein again.

It should be understood that sequence numbers of the foregoing processes do not mean execution sequences in various embodiments of this application. The execution sequences of the processes should be determined according to functions and internal logic of the processes, and should not be construed as any limitation to the implementation processes of the embodiments of this application.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A preamble sequence configuration method, comprising:

determining, by an access network device, preamble sequence information, wherein the preamble sequence information comprises a message indicating a quantity of preamble sequences, the preamble sequences are across a time domain, a frequency domain, and a code domain in a preamble sequence space, and the preamble sequence space further comprises a plurality of layers of code domain space in the code domain, and wherein determining the preamble sequence information comprises determining space level information that indicates a quantity of code domain space layers of the preamble sequence space;
including, by the access network device, the space level information in the preamble sequence information; and
sending, by the access network device, the preamble sequence information to user equipment, wherein the preamble sequence information comprises the space level information and is used by the user equipment for random access.

2. The preamble sequence configuration method according to claim 1, wherein the quantity of preamble sequences is a product of the quantity of code domain space layers of preamble sequence space and a quantity of preamble sequences in a layer of time-frequency resource.

3. The preamble sequence configuration method according to claim 1, wherein including, by the access network device, the space level information in the preamble sequence information and sending, by the access network device, the preamble sequence information to user equipment comprise:
generating, by the access network device, a cyclic redundancy check (CRC) code based on the space level information;
performing, by the access network device, check processing on a master system information block (MIB) based on the CRC code; and
sending, by the access network device over a physical broadcast channel (PBCH), the MIB that has undergone the check processing.

4. The preamble sequence configuration method according to claim 1, wherein including, by the access network device, the space level information in the preamble sequence information and sending, by the access network device, the preamble sequence information to user equipment comprise:
generating, by the access network device, a scrambling code sequence based on the space level information;
performing, by the access network device, scrambling processing on a MIB based on the scrambling code sequence; and
sending, by the access network device over a PBCH, the MIB that has undergone scrambling processing.

5. The preamble sequence configuration method according to claim 1, wherein including, by the access network device, the space level information in the preamble sequence information and sending, by the access network device, the preamble sequence information to user equipment comprise:
adding, by the access network device, the space level information in the preamble sequence information to a system information block (SIB); and
sending, by the access network device, the SIB over a physical downlink shared channel (PDSCH).

6. The preamble sequence configuration method according to claim 5, wherein the preamble sequence information further comprises time-frequency resource information, and the time-frequency resource information indicates a time-frequency resource across the time domain, and the frequency domain occupied by the preamble sequence space on a physical random access channel (PRACH); and
the sending, by the access network device, the preamble sequence information to user equipment further comprises:
adding, by the access network device, the time-frequency resource information in the preamble sequence information to the SIB; and
sending, by the access network device, the SIB over the PDSCH.

7. A preamble sequence configuration method, comprising:
obtaining, by user equipment, preamble sequence information sent by an access network device, wherein the preamble sequence information comprises a message indicating a quantity of preamble sequences, the preamble sequences are across a time domain, a frequency domain, and a code domain in a preamble sequence space, and the preamble sequence space further comprises a plurality of layers of code domain space in the code domain, and wherein the preamble sequence information comprises space level information that indicates a quantity of code domain space layers of the preamble sequence space;
obtaining, by the user equipment, the space level information in the preamble sequence information; and
performing, by the user equipment, random access based on the preamble sequence information.

8. The preamble sequence configuration method according to claim 7, wherein the quantity of preamble sequences is a product of the quantity of code domain space layers of preamble sequence space and a quantity of preamble sequences in a layer of time-frequency resource.

9. The preamble sequence configuration method according to claim 7, wherein obtaining, by user equipment, preamble sequence information sent by an access network device and obtaining, by the user equipment, the space level information in the preamble sequence information comprise:
performing, by the user equipment, blind detection on a physical broadcast channel (PBCH) to obtain a master system information block (MIB); and
determining the space level information based on a cyclic redundancy check (CRC) code removed during the blind detection.

10. The preamble sequence configuration method according to claim 7, wherein obtaining, by user equipment, preamble sequence information sent by an access network device and obtaining, by the user equipment, the space level information in the preamble sequence information comprise:
performing, by the user equipment, blind detection on a PBCH to obtain a MIB; and
determining the space level information based on a decoding sequence used during the blind detection.

11. The preamble sequence configuration method according to claim 7, wherein obtaining, by user equipment, preamble sequence information sent by an access network device and obtaining, by the user equipment, the space level information in the preamble sequence information comprise:
receiving, by the user equipment over a physical downlink shared channel (PDSCH), a system information block (SIB) sent by the access network device, wherein the SIB carries the space level information in the preamble sequence information; and
parsing, by the user equipment, the SIB to obtain the space level information.

12. The preamble sequence configuration method according to claim 11, wherein the preamble sequence information further comprises time-frequency resource information, and the time-frequency resource information indicates a time-frequency resource across the time domain, and the frequency domain occupied by the preamble sequence space on a physical random access channel (PRACH); and
the obtaining, by user equipment, preamble sequence information sent by an access network device further comprises:
receiving, by the user equipment over the PDSCH, the SIB sent by the access network device, wherein the SIB carries the time-frequency resource information in the preamble sequence information; and parsing, by the user equipment, the SIB to obtain the time-frequency resource information.

13. User equipment, comprising:

a receiver;

at least one processor coupled to the receiver; and a non-transitory computer-readable storage medium coupled to the at least one processor and storing programming instructions for execution by the at least one processor;

wherein the receiver is configured to obtain preamble sequence information sent by an access network device, wherein the preamble sequence information comprises a message indicating a quantity of preamble sequences, the preamble sequences are across a time domain, a frequency domain, and a code domain in a preamble sequence space, and the preamble sequence space further comprises a plurality of layers of code domain space in the code domain, and wherein the preamble sequence information comprises space level information that indicates a quantity of code domain space layers of the preamble sequence space;

wherein the receiver is configured to further obtain the space level information in the preamble sequence information; and wherein the programming instructions instruct the at least one processor to perform random access based on the preamble sequence information.

14. The user equipment according to claim 13, wherein the receiver is specifically configured to:

perform blind detection on a physical broadcast channel (PBCH) to obtain a master system information block (MIB); and determine the space level information based on a cyclic redundancy check (CRC) code removed during the blind detection.

15. The user equipment according to claim 13, wherein the receiver is specifically configured to:

perform blind detection on a PBCH to obtain a MIB; and determine the space level information based on a decoding sequence used during the blind detection.

16. The user equipment according to claim 13, the receiver is configured to receive, over a physical downlink shared channel (PDSCH), a system information block (SIB) sent by the access network device, wherein the SIB carries the space level information in the preamble sequence information; and the receiver is further configured to parse the SIB to obtain the space level information.

17. The user equipment according to claim 16, wherein the preamble sequence information further comprises time-frequency resource information, and the time-frequency resource information indicates a time-frequency resource across the time domain, and the frequency domain occupied by the preamble sequence space on a physical random access channel (PRACH);

the receiver is further configured to receive, over the PDSCH, the SIB sent by the access network device, wherein the SIB carries the time-frequency resource information in the preamble sequence information; and the receiver is further configured to parse the SIB to obtain the time-frequency resource information.

18. The user equipment according to claim 13, wherein the quantity of preamble sequences is a product of the quantity of code domain space layers of preamble sequence space and a quantity of preamble sequences in a layer of time-frequency resource.

* * * * *